(12) United States Patent
Semenov

(10) Patent No.: US 12,400,467 B2
(45) Date of Patent: Aug. 26, 2025

(54) IDENTIFICATION OF KEY-VALUE ASSOCIATIONS IN DOCUMENTS USING NEURAL NETWORKS

(71) Applicant: ABBYY Development Inc., Dover, DE (US)

(72) Inventor: Stanislav Semenov, Kommunarka (RU)

(73) Assignee: ABBYY Development Inc., Dover, DE (US)

(*) Notice: Subject to any disclaimer, the term of this patent is extended or adjusted under 35 U.S.C. 154(b) by 467 days.

(21) Appl. No.: 17/991,310

(22) Filed: Nov. 21, 2022

(65) Prior Publication Data

US 2024/0169752 A1 May 23, 2024

(51) Int. Cl.
G06V 30/413 (2022.01)
G06V 10/82 (2022.01)
G06V 30/19 (2022.01)
G06V 30/414 (2022.01)

(52) U.S. Cl.
CPC ............ *G06V 30/413* (2022.01); *G06V 10/82* (2022.01); *G06V 30/19147* (2022.01); *G06V 30/19173* (2022.01); *G06V 30/414* (2022.01)

(58) Field of Classification Search
CPC .... G06V 10/82; G06V 30/413; G06V 30/414; G06V 30/19147; G06V 30/19173
See application file for complete search history.

(56) References Cited

U.S. PATENT DOCUMENTS

| | | |
|---|---|---|
| 10,872,236 B1 | 12/2020 | Elor et al. |
| 10,878,234 B1 | 12/2020 | Adam et al. |
| 10,896,357 B1 | 1/2021 | Corcoran et al. |
| 11,275,934 B2 | 3/2022 | Reisswig et al. |
| 11,288,719 B2 | 3/2022 | Xu et al. |
| 2022/0108106 A1 | 4/2022 | Sathi et al. |
| 2023/0133690 A1* | 5/2023 | Gao .................. G06N 20/00 704/9 |

* cited by examiner

*Primary Examiner* — Daniel G Mariam
(74) *Attorney, Agent, or Firm* — Lowenstein Sandler LLP

(57) ABSTRACT

Aspects of the disclosure provide for mechanisms for identification of text fields in documents using neural networks. A method of the disclosure includes obtaining vectors, representative of objects in a document and processing the vectors to generate key hypotheses associating key(s) with one or more objects and value hypotheses associating value(s) with zero or more objects. The method further includes generating key-value association (KVA) hypotheses associating a selected key hypothesis with a selected value hypothesis and characterized by a KVA likelihood score that is based on at least a key likelihood score associated with the selected key hypothesis and a value likelihood score associated with the selected value hypothesis. The method further includes identifying one or more target KVAs of the document using the KVA likelihood scores of the generated KVA hypotheses.

20 Claims, 10 Drawing Sheets

FIG. 2

IDENTIFICATION OF KEY-VALUE ASSOCIATIONS IN DOCUMENTS USING NEURAL NETWORKS

TECHNICAL FIELD

The implementations of the disclosure relate generally to computer systems and, more specifically, to systems and methods for detecting objects and object associations in unstructured electronic documents using neural networks.

BACKGROUND

Detecting texts, graphic elements, and/or other objects in unstructured electronic documents is an important task in processing, storing, and referencing documents. In many instances, document processing includes identifying associations between objects, such as an association between a prompt ("Date of Birth) and a typed or handwritten entry (e.g., "Jan. 1, 2000"). Conventional approaches used for object detection include manually configuring e a large number of heuristics and templates, a process that typically involves a large number of human operations.

SUMMARY OF THE DISCLOSURE

Implementations of the present disclosure describe mechanisms for detecting, in electronic documents, an association between some object of a document (or a group of objects), referred to as a key herein, with another object (or a group of objects), referred to as a value herein. Such key-value associations may be causal (e.g., prompt-response, question-answer), geometric (e.g., cell-entry), mathematical (e.g., variable-number), linguistic (e.g., subject-action), contextual (e.g., general category—examples), referential (e.g., paragraph number-text), or any other association that may be advantageous to identify in a given computing application.

In one implementation, a method is disclosed that includes obtaining a plurality of vectors, wherein each vector of the plurality of vectors being representative of one of a plurality of objects in a document. The method further includes processing, using one or more neural network models (NNMs), the plurality of vectors to generate a plurality of key hypotheses, each key hypothesis of the plurality of key hypotheses associating a key with one or more objects of the plurality of objects, and a plurality of value hypotheses, each value hypothesis of the plurality of value hypotheses associating a value with zero or more objects of the plurality of objects. The method further includes generating, using the plurality of key hypotheses and the plurality of value hypotheses, one or more key-value association (KVA) hypotheses, each KVA hypothesis associating a selected key hypothesis of the plurality of key hypotheses with a selected value hypothesis of the plurality of value hypotheses. Each KVA hypothesis is characterized by a KVA likelihood score that is based on at least a key likelihood score associated with the selected key hypothesis. Each KVA hypothesis is further characterized by a value likelihood score associated with the selected value hypothesis. The method further includes identifying one or more target KVAs of the document using the KVA likelihood scores of the generated KVA hypotheses.

In one implementation, a system is disclosed that includes a system having a memory and a processing device operatively coupled to the memory. The processing device is configured to obtain a plurality of vectors, each vector of the plurality of vectors being representative of one of a plurality of objects in a document. The processing device is further configured to process, using one or more neural network models (NNMs), the plurality of vectors to generate a plurality of key hypotheses, each key hypothesis of the plurality of key hypotheses associating a key with one or more objects of the plurality of objects, and a plurality of value hypotheses, each value hypothesis of the plurality of value hypotheses associating a value with zero or more objects of the plurality of objects. The processing device is further configured to generate, using the plurality of key hypotheses and the plurality of value hypotheses, one or more key-value association (KVA) hypotheses, each KVA hypothesis associating a selected key hypothesis of the plurality of key hypotheses with a selected value hypothesis of the plurality of value hypotheses. Each KVA hypothesis is characterized by a KVA likelihood score that is based on at least a key likelihood score associated with the selected key hypothesis. Each KVA hypothesis is further characterized by a value likelihood score associated with the selected value hypothesis. The processing device is further configured to identify one or more target KVAs of the document using the KVA likelihood scores of the generated KVA hypotheses.

In one implementation, a non-transitory machine-readable storage medium is disclosed storing instructions that, when accessed by a processing device, cause a processing device to obtain a plurality of vectors, each vector of the plurality of vectors being representative of one of a plurality of objects in a document. The processing device is further configured to process, using one or more neural network models (NNMs), the plurality of vectors to generate a plurality of key hypotheses, each key hypothesis of the plurality of key hypotheses associating a key with one or more objects of the plurality of objects, and a plurality of value hypotheses, each value hypothesis of the plurality of value hypotheses associating a value with zero or more objects of the plurality of objects. The processing device is further configured to generate, using the plurality of key hypotheses and the plurality of value hypotheses, one or more key-value association (KVA) hypotheses, each KVA hypothesis associating a selected key hypothesis of the plurality of key hypotheses with a selected value hypothesis of the plurality of value hypotheses. Each KVA hypothesis is characterized by a KVA likelihood score that is based on at least a key likelihood score associated with the selected key hypothesis. Each KVA hypothesis is further characterized by a value likelihood score associated with the selected value hypothesis. The processing device is further configured to identify one or more target KVAs of the document using the KVA likelihood scores of the generated KVA hypotheses.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 2 illustrates example annotations of a document that may be used for training a neural network system to identify key-value associations, in accordance with some implementations of the present disclosure.

DETAILED DESCRIPTION

Figure 1:
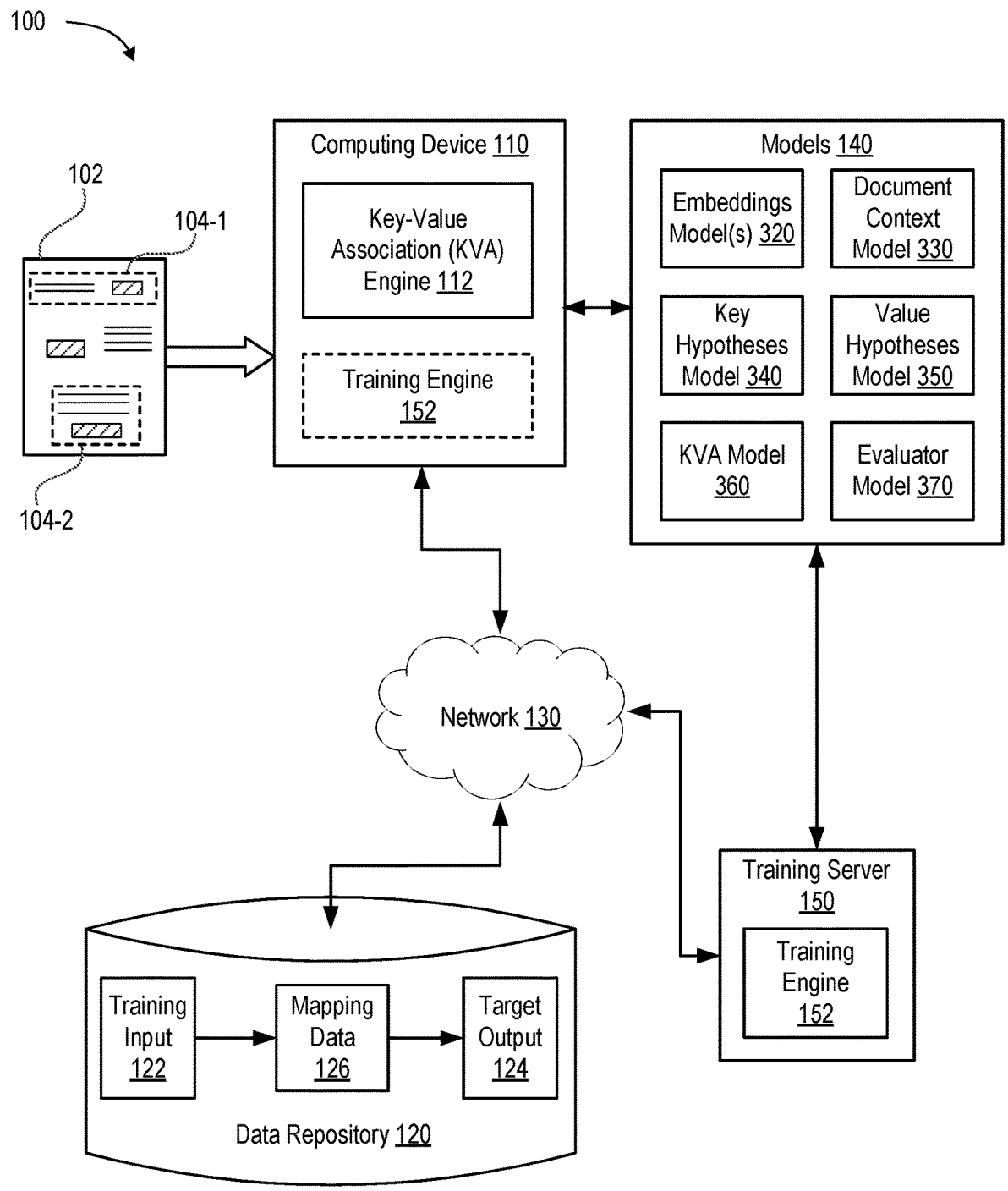
FIG. 1 is a block diagram of an example computer system in which implementations of the disclosure may operate.

A document may have numerous associations between different portions or elements (referred to as objects herein) of the document that may be desirable to identify in the course of document processing, review, storage, retrieval, searching, and so on. Types of possible associations are practically unlimited and may depend on the domain-specific task being performed. Such associations are referred to as key-value associations (KVA) herein. For example a KVA may be between a fillable field (key) and an entry into that field (value), an association between a footnote number (key) and a text of the footnote (value), an association between a reference (key) to a figure in a text and a depiction of that figure (value), an association between a multiple choice question (key) and a checkmark selecting from a number of responses (value). A key may include any suitable object or a group of objects, e.g., one or more fields, table partitions, fillable elements, prompts, indices, numerals, bookmarks, graphics elements, and the like. A value may similarly include any other object or a group of objects, e.g., any texts, graphics, symbols, numbers, signatures, stamps, and the like. KVAs may include causal (e.g., prompt-response, question-answer) associations, geometric (e.g., cell-entry) associations, functional (e.g., recipient field-email address) associations, mathematical (e.g., variable-number) associations, linguistic (e.g., subject-action) associations, contextual (e.g., general category—examples) associations, referential (e.g., paragraph number-text) associations, or any other associations. Accordingly, KVAs may be defined in any way that is advantageous in a given task-specific application, and may be customarily defined by an end user, which should be broadly understood as any individual, organization, professional or publishing standard, business or technical convention, and the like.

In one example, documents (e.g., standard forms) often include one or more static keys (e.g., fields, tables, frames, etc.), that prompt or direct a person, a computer, or some other device, to enter a value, e.g., using letters, numbers, or any other alphanumeric strings or symbols. In structured electronic documents, e.g., documents that are filled out by customers, contractors, employees, record keepers, or any other users in digital form (e.g., on a computer, digital kiosk, or using some other digital interface), entered values may be automatically associated with correct keys. In many instances, however, information is entered into printed or other physical documents or electronic unstructured documents (e.g., a scan of a physical form) using various writing or typing instruments, including pens, pencils, typewriters, printers, stamps, and the like, with filled out forms subsequently scanned or photographed to obtain an unstructured image of the form/document. In other instances, information is entered into unstructured electronic documents using a computer. The unstructured electronic documents may be stored, communicated, and eventually processed by a recipient computer to identify information contained in the documents, including determining values of various populated fields, e.g., using techniques of optical character recognition (OCR).

In various documents, keys and values may have different locations. For example, invoices of different vendors may have keys "goods," "price," "total," etc., located at different parts of the invoices, and may also be formatted in a different way, e.g., one vendor may use a table format while another vendor may use a list format, and so on. Typical approaches to detecting KVAs are based on heuristics. More specifically, a large number (e.g., hundreds) of documents, such as restaurant checks or receipts, are collected and statistics indicating where associated keys and values are likely to be placed can be analyzed. In particular, the heuristic approaches can track specific words used in conjunction with "total purchase amount," words used with "taxes," words used with "credited amount," and so on. A new document is then processed in view of the collected statistics while tracking typical words. The heuristic approaches, however, can fail in the instances where keys and/or values are placed at unexpected locations and/or when words of a document are misrecognized/miscategorized. Other approaches include neural network-based systems that are capable of taking into account global document context for more accurate KVA identification. However, even the existing neural network-based techniques achieve significantly better results for documents of the types used in training than for documents of new and previously unseen types. For example, a neural network system trained on invoices may be significantly less effective when used on tax forms or credit card slips. As a result, such systems often require lengthy and high-volume re-training on the end user's documents even if pre-trained using a large number of training documents.

Aspects and implementations of the present disclosure address the above noted and other challenges of the existing technology by providing for effective mechanisms of identification of key-value associations in documents of broad range of types and layouts that can be different from types and layouts learned during training. The disclosed mechanisms include, in some implementations, a neural network (NN) system that includes a number of models (subnetworks), wherein individual models are trained to perform a specific task that contributes to the overall function and efficiency of the NN system. More specifically, the NN system may include one or more embeddings models trained to represent various objects in an input document via a unique numerical representation (embedding) that encodes the object's properties and likely surroundings (e.g., typical context). For example, embeddings that are typically found in similar linguistic or logical context may have different but close values (e.g., substantial cosine similarity). One embeddings model may be used to generate symbol embeddings that encode properties/context of alphanumeric strings, punctuation marks, glyphs, etc., referred to as symbol sequences herein. Another embeddings model may be used to generate graphics embeddings that encode properties/context of graphical elements, e.g., logos, signatures, figures, drawings, and the like.

Joint object embeddings, obtained by combining symbol embeddings with graphics embeddings, may be processed by a document context model that first transforms object embeddings into feature vectors associated with the detected objects and then recalculates the feature vectors in view of embeddings of various other objects. As a result, the recalculated feature vectors maintain representation of the underlying objects while also acquiring awareness of the presence of other objects.

The recalculated feature vectors may be processed by a key hypotheses model and a value hypotheses model, in one implementation. More specifically, the key hypotheses model may generate multiple hypotheses of association of one or more objects of the document with a particular key. Similarly, the value hypotheses model may generate multiple hypotheses of association of one or more objects of the document with a particular value. The output hypotheses may then be processed by a trained KVA model that generates multiple KVA hypotheses, each KVA hypothesis linking a specific hypothesized key with a one of hypothesized value. Different KVA hypotheses may then be combined (e.g., without contradictions, such as a given value associated with multiple different keys) to obtain one or more aggregated hypotheses. A trained evaluator may then evaluate the likelihood (probability) that various aggregated hypotheses are correct and select (e.g., as the hypothesis with the highest likelihood) one of the hypotheses as the final key-value associations of the document.

Numerous additional implementations are disclosed herein. The advantages of the disclosed NN systems and techniques include but are not limited to efficient determination of KVAs in documents (images of documents) of a wide range of different types and layouts, including types and layouts not previously seen by the NN system during training (or validation).

As used herein, a "document" may refer to any collection of symbols, such as words, letters, numbers, glyphs, punctuation marks, barcodes, pictures, logos, etc., that are printed, typed, handwritten, stamped, signed, drawn, painted, and the like, on a paper or any other physical or digital medium from which the symbols may be captured and/or stored in a digital image. A "document" may represent a financial document, a legal document, a government form, a shipping label, a purchasing order, an invoice, a credit application, a patent document, a contract, a bill of sale, a bill of lading, a receipt, an accounting document, a commercial or governmental report, a page in a book or a magazine, or any other suitable document that may have one or more key-value associations of interest. A "key" or a "value" may refer to any object (or multiple objects), e.g., text, alphanumeric sequence, symbol sequence, glyph sequence, region, portion, partition, table, table element, etc., of a document. Keys and/or values may be defined by the end user in any suitable manner. The size of keys and/or values may range from a single symbol (or a small graphical element) to multi-word (or even multi-paragraph) texts and/or complex drawings. It should be understood that no object (or a type of object) inherently belongs to the key class or the value class and that the same object (e.g., text or graphics) may be defined as a key in documents of one type and as a value in document of another type. For example, in some documents "Date of Birth" may be defined as a key and "Jan. 1, 2020" may be defined as a value whereas in other documents both "Date of Birth" and "Jan. 1, 2020" may be defined as part of the same key (with the name of a person defined as a value). Correspondingly, no restriction is assumed to be imposed on keys and/or values expect that a key is assumed to include at least one object (e.g., letter, symbol, numeral, table elements, graphics element, etc.) whereas a value may have one or more objects, but may also have no objects (a null value).

Keys and/or values may be typed, written, drawn, stamped, painted, copied, or entered in any other way. A document may have any number of keys, e.g., a name key, an address key, a merchandize ordering key, a price key, an amount of goods key, a bank account key, a date key, an invoice number key, or any other type of a key. Correspondingly, the document may have any number of values (some of which may be null) associated with the corresponding key (and thus forming the corresponding KVAs).

A document may be captured via any suitable scanned image, photographed image, or any other representation capable of being converted into a data form accessible to a computer. In accordance with various implementations of the present disclosure, an image may conform to any suitable electronic file format, such as PDF, DOC, ODT, JPEG, BMP, etc.

The techniques described herein may involve training neural networks to process images, e.g., to classify various objects among multiple classes, e.g., a key class, a value class, a neutral object class, and so on. The neural network(s) may be trained using training datasets that include documents of various types populated with different numbers of KVAs. Training datasets may include images of real documents and/or images of synthetic documents, and/or any combination thereof. During training, an NN system may generate a training output for each training input. The training output of the NN system may be compared with a desired target output as specified by the training dataset, and the error may be propagated back to the previous layers of the neural network, whose parameters (e.g., the weights and biases of the neurons) may be adjusted accordingly (e.g., using a suitable loss function) to optimize prediction accuracy. A trained NN system may be applied for identification of KVAs and determination of the corresponding keys and values in any suitable documents including documents that are different from types of documents used in training.

FIG. 1 is a block diagram of an example computer system 100 in which implementations of the disclosure may operate. As illustrated, system 100 can include a computing device 110, a data repository 120, and a training server 150 connected to a network 130. Network 130 may be a public network (e.g., the Internet), a private network (e.g., a local area network (LAN) or wide area network (WAN)), or a combination thereof.

The computing device 110 may include a desktop computer, a laptop computer, a smartphone, a tablet computer, a server, a scanner, or any suitable computing device capable of performing the techniques described herein. In some implementations, the computing device 110 can be (and/or include) one or more computer systems 1000 of FIG. 10.

Computing device 110 may receive a document 102 that may include any suitable texts, numbers, graphics, tables, and the like. Document 102 may be received in any suitable manner. For example, computing device 110 may receive a digital copy of document 102 by scanning or photographing a document, an object, a scenery, a view, and so on. Additionally, in those instances where computing device 110 is a server, a client device connected to the server via the network 130 may upload a digital copy of document 102 to the server. In the instances where computing device 110 is a client device connected to a server via the network 130, the client device may download document 102 from the server or from data repository 120.

Computing device 110 may include a KVA engine 112 trained to identify presence of one or more keys, values, and the respective KVAs 104-1, 104-2, etc., in document(s) 102. Each KVA 104-$n$ may include a key and a value. Each key may include at least one object (the number of objects is not limited) and each value may include any number of objects (including zero objects).

In some implementations, KVA engine 112 may use a set of machine learning (e.g., neural network) models 140 trained for identification of KVAs. For example, KVA engine 112 may use one or more embeddings models 320 that digitally represent various objects in document 102 via embeddings that encode properties of those objects. Document context model 330 may transform object embeddings into feature vectors that account for context provided by other objects in document 102. Key hypotheses model 340 may generate hypotheses of association of object(s) in document 102 with various keys. Similarly, value hypotheses model 350 may generate hypotheses of association of object(s) of document 102 with possible values. KVA model 360 may use the generated key and value hypotheses to produce aggregated KVA hypotheses in which various hypothesized keys are associated with various hypothesized values. Evaluator model 370 may evaluate (score) the likelihood of document-level hypotheses and select one of the aggregated hypotheses as the most likely set of KVAs of document 102.

KVA engine 112 and/or one or more of models 140 may include (or may have access to) instructions stored on one or more tangible, machine-readable storage media of computing device 110 and executable by one or more processing devices of computing device 110. In one implementation, KVA engine 112 and/or one or more of models 140 may be implemented as a single component. KVA engine 112 and/or one or more of models 140 may each be a client-based application or may be a combination of a client component and a server component. In some implementations, KVA engine 112 and/or one or more models 140 may be executed entirely on the client computing device, such as a server computer, a desktop computer, a tablet computer, a smart phone, a notebook computer, a camera, a video camera, or the like. Alternatively, some portion of KVA engine 112 and/or one or more of models 140 may be executed on a client computing device (which may receive document 102) while another portion of KVA engine 112 and/or one or more of models 140 may be executed on a server device that performs ultimate determination of key-value associations. The server portion may then communicate keys and values to the client computing device, for further usage and/or storage. Alternatively, the server portion may provide the identified KVAs to another application. In other implementations, KVA engine 112 and/or one or more of models 140 may execute on a server device as an Internet-enabled application accessible via a browser interface.

A training server 150 may construct one or more models 140 (or other machine learning models) and train one or more models 140 to perform identification of KVAs. Training server 150 may include a training engine 152 that performs training of models 140. Training server 150 may be and/or include a rackmount server, a router computer, a personal computer, a portable digital assistant, a mobile phone, a laptop computer, a tablet computer, a camera, a video camera, a netbook, a desktop computer, a media center, or any combination of the above. Training server 150 may include a training engine 152. Training engine 152 may determine architecture of models 140 and train models 140 to perform KVAs identification. As illustrated in FIG. 1, models 140 may be trained by training engine 152 using training data that includes training inputs 122 and corresponding target outputs 124 (expected correct answers for the respective training inputs). Models 140 may include multiple levels of linear or non-linear operations, e.g., deep neural networks. Examples of deep neural networks that may be used include convolutional neural networks, recurrent neural networks (RNN) with one or more hidden layers, fully connected neural networks, attention-based neural networks, and so on.

Training engine 152 may generate training data to train models 140. Training data may be stored in a data repository 120 and include one or more training inputs 122 and one or more target outputs 124. The training data may also include mapping data 126 that maps the training inputs 122 to the target outputs 124. Target outputs 124 may include ground truth that includes annotation of keys and values of training inputs 122 and may further include annotations of correct associations of keys and values. During the training phase, training engine 152 may find patterns in the training data that can be used to map the training inputs to the target outputs. The patterns can be subsequently used by models 140 for future predictions (inferences, detections).

Data repository 120 may be a persistent storage capable of storing files as well as data structures to perform identification of key-value associations, in accordance with implementations of the present disclosure. Data repository 120 be hosted by one or more storage devices, such as main memory, magnetic or optical storage disks, tapes, or hard drives, network-attached storage (NAS), storage area network (SAN), and so forth. Although depicted as separate from the computing device 110, data repository 120 may be part of computing device 110. In some implementations, data repository 120 may be a network-attached file server, while in other implementations data repository 120 may be some other type of persistent storage such as an object-oriented database, a relational database, and so forth, that may be hosted by a server machine or one or more different machines coupled to the via the network 130.

In some implementations, training engine 152 may train models 140 that include multiple neurons to perform KVA identification, in accordance with implementations of the present disclosure. Each neuron may receive its input from other neurons or from an external source and may produce an output by applying an activation function to the sum of weighted inputs and a trainable bias value. A neural network may include multiple neurons arranged in layers, including an input layer, one or more hidden layers, and an output layer. Neurons from different layers may be connected by weighted edges. The edge weights are defined at the network training stage based on a training dataset that includes a plurality of images with known KVAs. In one illustrative example, all the edge weights may be initially assigned some random values. For every training input 122 in the training dataset, training engine 152 may compare observed output of the neural network with the target output 124 specified by the training data set. The resulting error, e.g., the difference between the output of the neural network and the target output, may be propagated back through the layers of the neural network, and the weights and biases may be adjusted in the way that makes observed outputs closer to target outputs 124. This adjustment may be repeated until the error for a particular training input 122 satisfies a predetermined condition (e.g., falls below a predetermined error). Subsequently, a different training input 122 may be selected, a new output may be generated, and a new series of adjustments may be implemented, and so on, until the neural network is trained to a sufficient degree of accuracy.

After models 140 have been trained, the set of models 140 may be provided to computing device 110 for inference analysis of new data. For example, computing device 110 may process a new document 102 using the provided models 140, identify keys and values and determine key-value associations of new document 102. In some implementations, a copy (or some other version) of training engine 152 may be provided to computing device 110 and used to perform additional training of models 140 using training data that is domain-specific and may include documents of types that are of particular interest to the customer.

Figure 2:
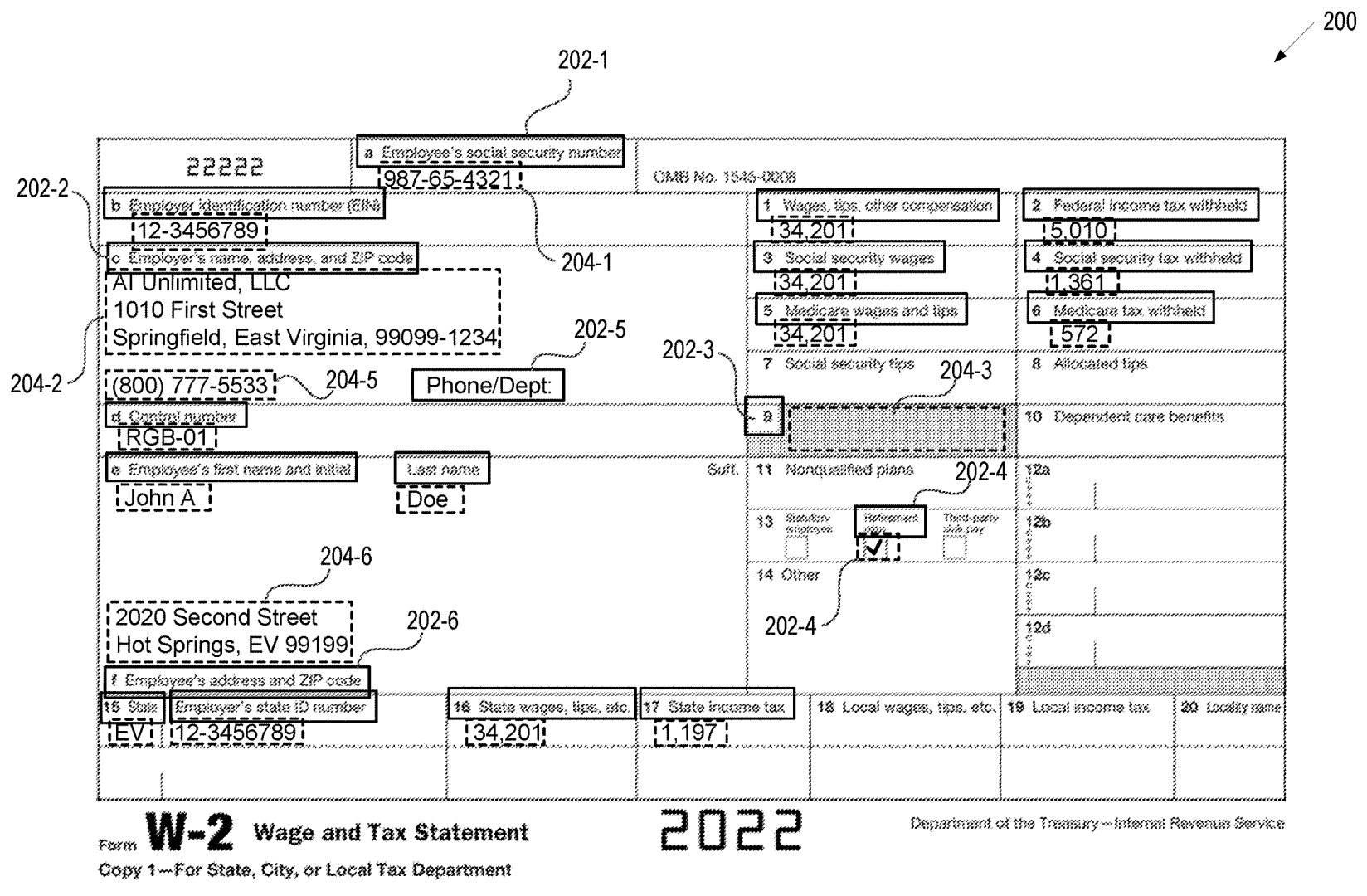

FIG. 2 illustrates example annotations 200 of a document that may be used for training a neural network system to identify key-value associations, in accordance with some implementations of the present disclosure. Annotations 200 may identify keys 202-$n$ and values 204-$n$ that the NN system is being trained to identify. Identifications and/or depictions of keys 202-$n$ and values 204-$n$ may have any suitable form, such as bounding boxes, which may be specified by (e.g., two) sets of coordinates of opposite vertices or by coordinates of the centers of the bounding boxes and widths/heights of those boxes. In FIG. 2 keys 202-$n$ are annotated with solid boxes and values 204-$n$ are annotated with dashed boxes. Annotations 200 may further include associations between various keys 202-$n$ and correct values 204-$n$. Keys 202-$n$ and values 204-$n$ may include any number of words, numerals, symbols, lines, and the like. For example, key 202-1 ("a Employee's social security number") has multiple words and the corresponding key 204-1 ("987-65-4321") has multiple numerals. Key 202-2 ("c Employer's name, address, and ZIP code") has the associated value 204-2 that includes multiple lines of text. Some keys and/or symbols may include a single word or even a single symbol, e.g., key 202-3 ("9") is a single-symbol key. Some values may be zero or null (having no symbols), e.g., value 204-3 is null. Some keys and/or values may include symbols that are not alphanumeric characters. For example, key 202-4 may include words ("Retirement plan") while the associated value 204-4 includes a checkmark. Keys and values may have any relative spatial arrangement. For example, keys 202-1, 202-2, and 202-3 are positioned above the respective associated values 204-1, 204-2, and 204-3. Key 202-3 is positioned to the left of the associated value 204-3, key 202-5 is positioned to the right of the associated value 204-5, and key 202-6 is positioned below the associated value 204-6.

Figure 3:
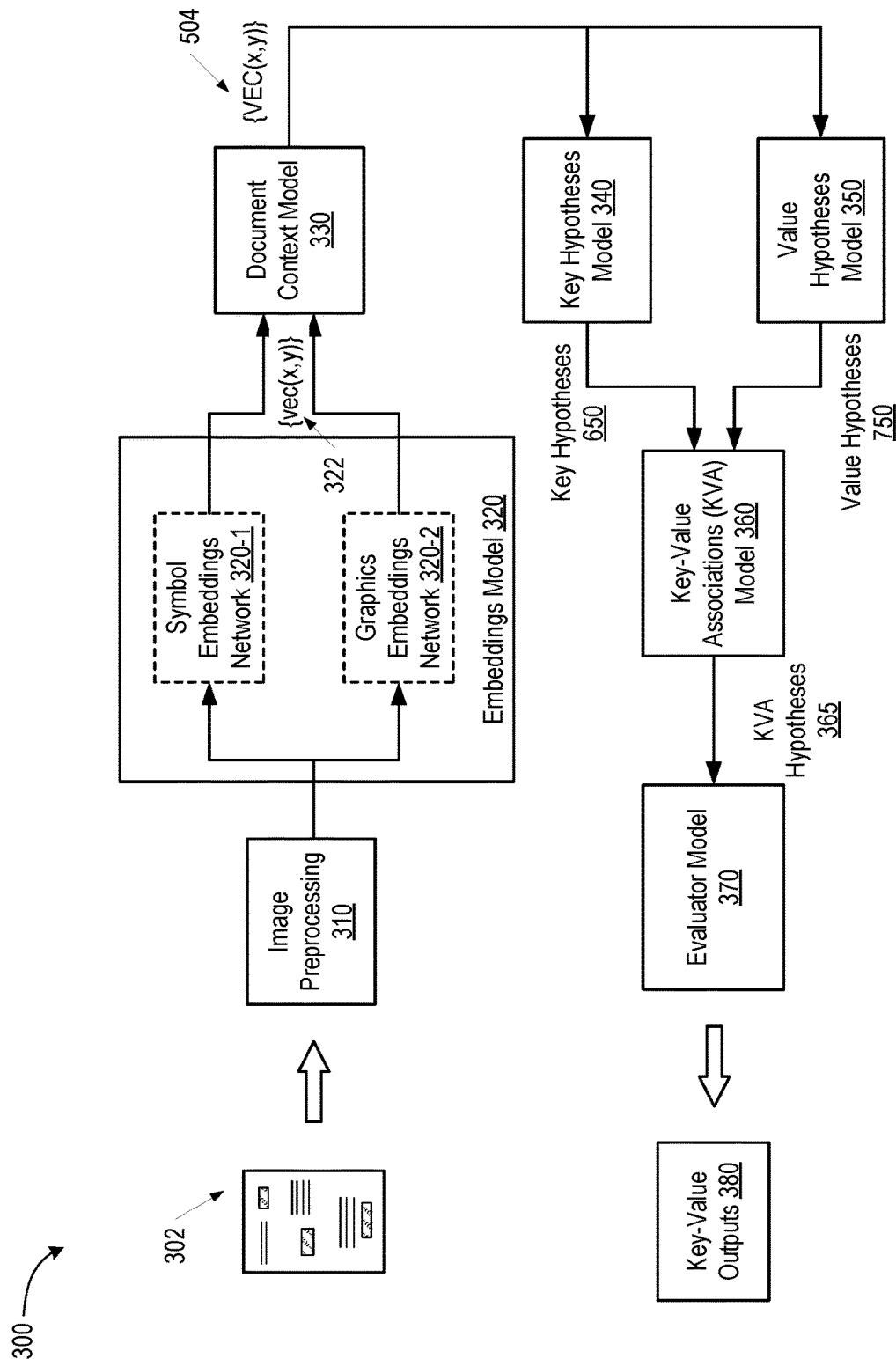
FIG. 3 illustrates example operations of a system capable of efficient identification of key-value associations in electronic documents, in accordance with some implementations of the present disclosure.

FIG. 3 illustrates example operations of a system 300 capable of efficient identification of key-value associations in electronic documents, in accordance with some implementations of the present disclosure. In some implementations, system 300 may be a part of example computer system 100 of FIG. 1. Input document 302 may be obtained by imaging (e.g., scanning, photographing, etc.) and may include a portion of a page, a full page, or multiple pages. Input document 302 may have any number of regions depicting keys and regions depicting the associated values. Keys and/or values may be typed, handwritten, drawn, stamped, or filled in any other manner. In some implementations, input document 302 may be generated immediately before KVA identification is performed. In some implementations, input document 302 may be generated at some point in the past, and retrieved for KVA identification from a local storage or a network (e.g., cloud) storage. Input document(s) 302 may undergo image preprocessing 310, which may include enhancing the quality of input document(s) 302, including changing dimensions (including aspect ratio), rotating or re-aligning, gray-scaling, normalization, data augmentation, binarization, de-blurring, filtering, sharpening, de-noising, amplification, and the like.

Output of image preprocessing 310 may be processed by an embeddings model 320 that generates numerical representations (vectors, embeddings, etc.) vec(x,y) 322 for various objects of input document 302 associated with specific locations that may be indexed in any suitable way, e.g., via Cartesian coordinates (x, y). Embeddings vec(x,y) 322 may be generated for any object. For example, some of embeddings vec(x,y) 322 may represent symbol sequences that include a single symbol or multiple symbols, such as words, strings of words (e.g., phrases, sentences), characters, numerals, glyphs, punctuation marks, and the like. Some of embeddings vec(x,y) 322 may characterize graphics elements, which may include geometric figures (e.g., boxes, lines, circles, polygons, etc.), elements of a table (e.g., corner, cell, row, column), drawings or parts of drawings, photographs or parts of photographs, logos, arcs, free lines (e.g., parts of handwritten signatures, etc.), and the like. In some implementations, embeddings model 320 may include multiple neural networks, e.g., a symbol embeddings network 320-1 that generates embeddings of symbols and symbol sequences, and graphics embeddings network 320-2 that generates embeddings of graphics elements.

Figure 4:
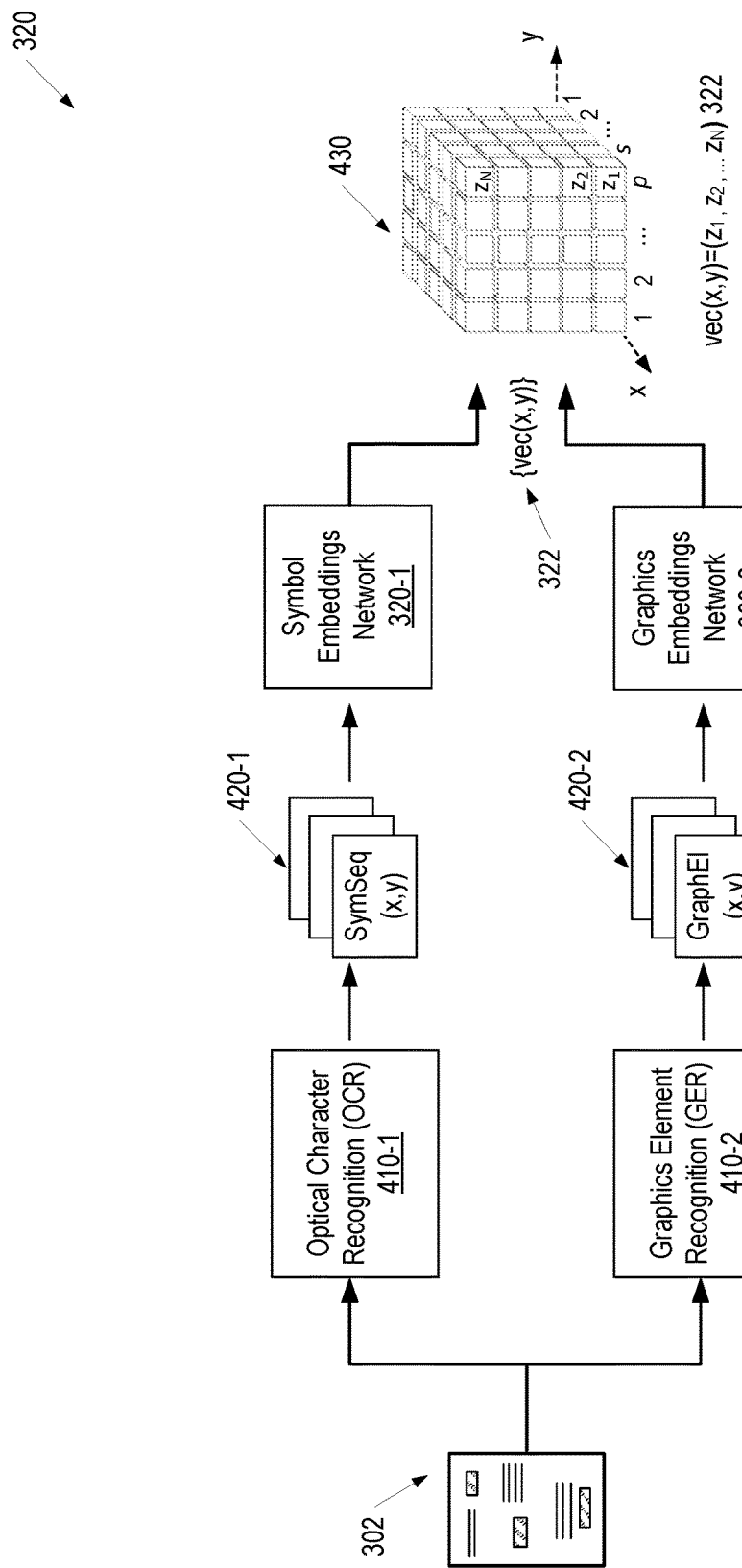
FIG. 4 is a schematic diagram illustrating an example architecture of an embeddings model, which may be deployed as part of a neural network system that identifies key-value associations in documents, in accordance with some implementations of the present disclosure.

FIG. 4 is a schematic diagram illustrating an example architecture of embeddings model 320, which may be deployed as part of a neural network system that identifies key-value associations in documents, in accordance with some implementations of the present disclosure. Input document 302 may undergo optical character recognition (OCR) 410-1. The output of OCR 410-1 may include a set of recognized sequences of symbols SymSeq(x, y) 420-1 associated with coordinates (x, y) of input document 302. Symbol sequences 420-1 may be or include one or more alphanumeric characters that may be combined into syllables, words, and/or sentences. Symbol sequences 420-1 may include one or more punctuation marks, such as a comma, period, ellipses, or any other marks. In some implementations, to generate symbol sequences 420-1 of input document 302, OCR 410-1 may divide the text of the document into words and/or combinations of words and extract character sequences from the words/combinations.

Input document 302 may also undergo graphics element recognition (GER) 410-2. The output of GER 410-2 may be a set of recognized graphics elements GraphEl(x, y) 420-2 associated with coordinates (x, y) of input document 302. Graphics elements 420-2 may be or include one or more boxes, lines, circles, polygons, and/or other geometric figures, or any combination thereof. Graphics elements 420-2 may include elements of a table, e.g., corner, cell, row, column, horizontal, vertical, or oblique lines of tables, three-way or four-way intersections of the lines, drawings or parts of drawings, and the like. Graphics elements 420-2 may further include any embedded photographs or images, logos, arcs, free lines, e.g., parts of handwritten signatures, and the like.

The identified symbol sequences 420-1 and/or graphics elements 420-2, referred to jointly as objects herein, may be mapped to the corresponding regions of input document 302 where these objects are located. For example, each objects may be associated with one or more sets of coordinates (x, y) that identify a location of the object. The coordinates may be Cartesian coordinates or any other (e.g., polar) coordinates, as may be convenient in identifying locations of the objects. A single character, a punctuation mark, a circle, or a short line may be identified by a single set of coordinates (x, y) whereas longer sequences (words, sentences) and extended graphics elements may be identified by multiple sets of coordinates (x, y), such as the coordinates of the four corners of a box enclosing the object, or coordinates and a radius of a bounding circle, or any other suitable enclosure. A line may be identified by the coordinates of the two ends of the line. An intersection of two lines (e.g., a three-way or a four-way intersection) may be identified by the coordinates of the ends of the lines as well as the coordinates of the intersection. It should be understood that throughout this disclosure (x, y) are used to denote any identification of objects with any suitable coordinates or geometric identifiers sufficient to unambiguously identify the respective specific symbol sequences and/or graphics elements.

Embeddings model 320 may input symbol sequences 420-1 into symbol embeddings network 320-1 to generate embeddings (feature vectors) for each of symbol sequences 420-1: SymSeq(x, y)→vec(x,y). Similarly, graphics elements 420-2 may be input into graphics embeddings network 320-2 to generate embeddings (feature vectors) for each of graphics elements 420-2: GraphEl(x, y)→vec(x,y). Each of the embeddings vec(x,y) 322 may be a vector of a predetermined length N, e.g., N=64, 128, 192, 256, etc., which implements a digital representation of the corresponding object (a symbol sequence or a graphics element). In those instances where the object is small (e.g., a short character sequence or a small figure) and an embedding is shorter than the predetermined length N, the embedding may be padded (e.g., with zeros) to the predetermined length. An embedding vec(x,y) digitally encodes various properties of the corresponding object properties including core properties, e.g., the meaning of a word, and various attribute properties, e.g., font type, font size, formatting (underlining, italicizing, etc.), color, and so on. In some implementations, embeddings may further encode information about likely surroundings of the object, e.g., typical context in which the word is likely to be found. For example, embeddings that are typically found in similar linguistic or logical context may have but close values (e.g., vectors having cosine similarity that is close to 1).

Symbol embeddings network 320-1 may be trained in conjunction with a suitable natural language processing model, a text analysis model, or any other similar model. For example, an auxiliary model may be trained to process text and classify different symbols of the text among a number of classes. The auxiliary model may include an encoder portion that represent words and other symbol sequences via symbol embeddings and a classifier portion that uses the symbol embeddings to perform symbol classification. In some implementations, the auxiliary model may be trained using a corpus of words and symbols that are found in the type of target documents in which KVA associations are to be identified, e.g., financial documents, tax documents, manufacturing inventory documents, and so on. After the auxiliary model has been trained, the classifier portion may be removed and the encoder portion may be deployed as symbol embeddings network 320-1.

Similarly, graphics embeddings network 320-2 may be trained in conjunction with a suitable computer vision model. For example, an auxiliary model may be trained to perform object recognition. The auxiliary model may include an encoder portion that represents various pictures via graphics embeddings and a classifier portion that uses the graphics embeddings to perform object classification. In some implementations, the auxiliary model may be trained using a collection of objects that are found in the type of target documents in which KVA associations are to be identified. After the auxiliary model has been trained, the classifier portion may be removed and the encoder portion may be deployed as graphics embeddings network 320-2.

In some implementations, the length N of symbol embeddings 320-1 and graphics embeddings 320-2 may be the same. In some implementations, the length N is selected to be larger (e.g., N=128 or 192 components) in the instances of more complex documents and, conversely, selected to be smaller (e.g., N=32 or 64 components) for simpler documents with a limited dictionary of words and a limited variety of symbols. Each of N components $z_j$ of an embedding 322, vec(x,y)=$(z_1, z_2, \ldots z_N)$, may be a binary number, a decimal number, a hexadecimal number, or any other number accessible to a computer.

The output of symbol embeddings network 320-1 and graphics embeddings network 320-2 may be combined into a tensor 430 made of the components of individual embeddings 322 of the set {vec(x,y)}. More specifically, the area of input document 302 may be discretized into p cells along the x-direction and s cells along the y-direction (e.g., p=32 and s=64, in one example implementation). An object (word, picture) centered at a particular cell (x, y) may have its embedding vec(x,y)=$(z_1, z_2, \ldots z_N)$ visualized as a sequence of blocks (cells) stacked along the third direction, as shown schematically in FIG. 4. Other vectors may be similarly stacked into other cells of tensor 430 whose total number of cells may thus be s×p×N. To form tensor 430, a Map function (e.g., Gather) may be deployed.

Some of the vertical stacks of tensor 430 may be empty (e.g., filled with zeros), e.g., cells corresponding to locations (x, y) of empty spaces of input document 302, for which symbol embeddings network 320-1 and graphics embeddings network 320-2 have output no embeddings 322. A row (along the x-direction) or a column (along the y-direction) may have all zeros for all its cells if such a row or a column does not include any objects. At some (or even most) locations where an object is detected, the corresponding embedding 322 may be generated by one of symbol embeddings network 320-1 or graphics embeddings network 320-2 (since most objects are likely to be recognized as either symbols or graphics elements and not both). In some instances, some of the locations may be recognized by both symbol embeddings network 320-1 (as being associated with one or more symbols) and by graphics embeddings network 320 (as being associated with graphics) at the same time. In such instances, symbol embeddings network 320-1 may output a nonzero embedding $vec_S(x,y)$ and graphics embeddings network 320-2 may output a nonzero embedding $vec_G(x, y)$. In such instances, the total embedding for the corresponding location may be obtained by joining the two embeddings, e.g., by adding, vec(x,y)=$vec_S(x,y)+vec_G$ (x, y), or by concatenating the two embeddings, vec(x, y)=$\text{vec}_S(x, y) \| \text{vec}_G(x, y)$, or by otherwise combining the two embeddings.

With a continued reference to FIG. 3, tensor 430 made of embeddings {vec(x,y)} 322 may be input to document context model 330 that recalculates the embeddings, Recalc ({vec(x, y)})→{VEC (x, y)}, in view of the global context of the whole document. More specifically, document context model 330 may include one or more neural networks that may modify components of individual embeddings vec(x,y) in view of all other embeddings of tensor 430. As a result, the recalculated vectors (features) VEC(x,y)=($Z_1, Z_2, \ldots Z_N$) may account for the presence and nature of various other objects in input document 302.

Figure 5:
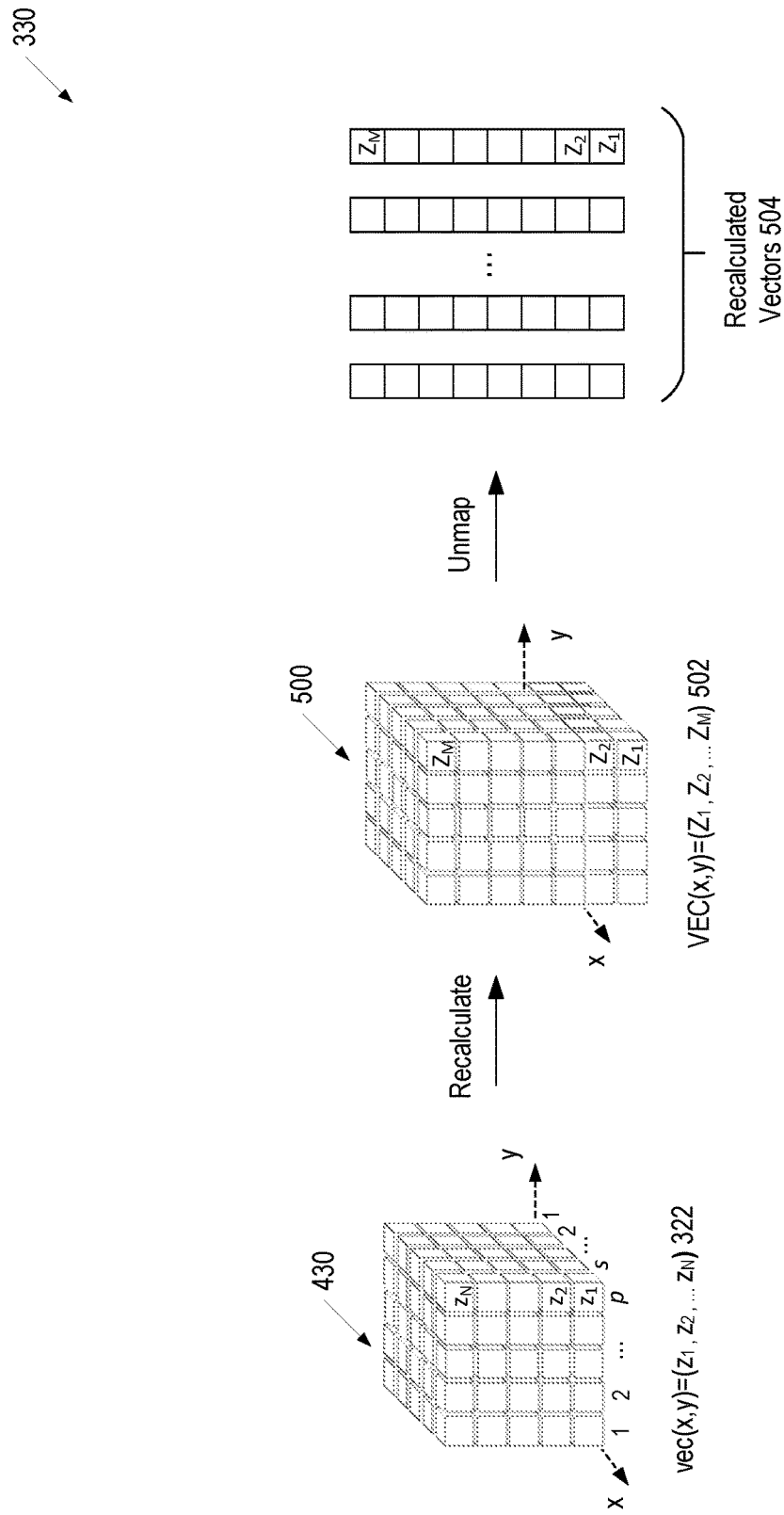
FIG. 5 is a schematic diagram illustrating an example architecture of a document context model, which may be deployed as part of a neural network system that identifies key-value associations in documents, in accordance with some implementations of the present disclosure.

FIG. 5 is a schematic diagram illustrating an example architecture of document context model 330, which may be deployed as part of a neural network system that identifies key-value associations in documents, in accordance with some implementations of the present disclosure. Tensor 430 of embeddings vec(x,y) may be processed by one or more neural networks, which may be or include convolutional networks, recurrent networks, long short-term memory (LSTM) networks, attention-based networks, and/or other neural networks. The neural networks may include one or more layers of convolutions. Convolutions may use filters that recalculate components $z_i(x_j, y_k)$ of tensor 430 based on other components of tensor 430. Convolutions may be performed along the x-direction, e.g., with components $z_i(x_j, y_k)$ recalculated based on components $z_i(x_{j\pm1}, y_k)$, $Z_i(x_{j\pm2}, y_k)$, etc., depending on the size of the filters being deployed. Convolutions may also be performed along the y-direction, e.g., with components $z_i(x_j, y_k)$ recalculated based on components $z_i(x_j, y_{k\pm1})$, $z_i(x_j, y_{k\pm2})$, etc., depending on the size of the filters. The convolutions may further be performed along the vertical z-direction of tensor 430, e.g., filters may be applied within the xz-plane and/or within the yz-plane. In some implementations, 3D filters may be applied along all three dimensions of tensor 430. Filters may have any suitable size and stride.

Recalculated tensor 500 may include p×s M-component vectors VEC(x,y)=($Z_1, Z_2, \ldots Z_M$) 502. The number of components M may be the same as N or different from N, e.g., greater or smaller than N. An Unmap (e.g., Scatter) function may unmap recalculated tensor 500 into a set of unmapped recalculated vectors 504 having the original length (N components). In some implementations, the Unmap function may eliminate zero vectors 502, e.g., vectors with all zero components $Z_1, Z_2, \ldots Z_M$ (or with all components below some threshold value corresponding to noise). In some implementations, the Unmap function may also eliminate zero (or below-threshold) components $Z_1, Z_2, \ldots Z_M$ or select a predetermined number m of the largest components $Z_1, Z_2, \ldots Z_m$. The selected components $Z_1, Z_2, \ldots Z_m$ of the recalculated vectors 504 provide digital representations of features of various objects located at corresponding (x, y) while at the same time capturing the global context of the entire input document 302 by maintaining awareness of other objects in input document 302.

With a continued reference to FIG. 3, recalculated vectors 504 may be used as an input into key hypotheses model 340 and value hypotheses model 350, each model generating one or more hypotheses that identify various objects of input document 302 as belonging to one or more keys $K_1$, $K_2 \ldots$ and one or more values $V_1, V_2$.

Figure 6:
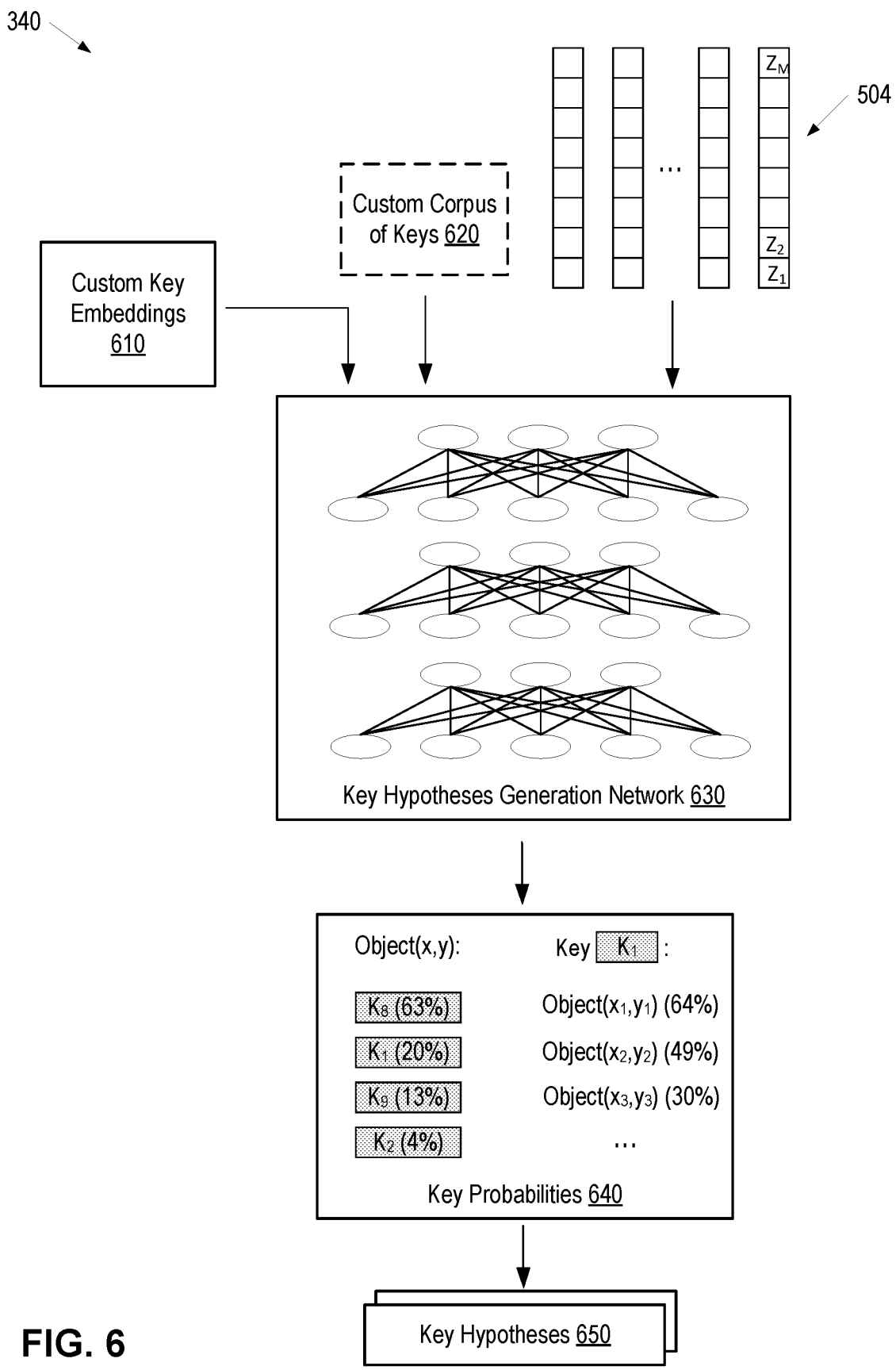
FIG. 6 is a schematic diagram illustrating operations of a key hypotheses model, which may be deployed as part of a neural network system that identifies key-value associations in documents, in accordance with some implementations of the present disclosure.

FIG. 6 is a schematic diagram illustrating example operations of key hypotheses model 340, which may be deployed as part of a neural network system that identifies key-value associations in documents, in accordance with some implementations of the present disclosure. As depicted in FIG. 6, a set of recalculated vectors {VEC(x,y)} 504 may be processed by a key hypotheses generation network 630 that predicts a class of keys for various objects corresponding to the respective recalculated vectors VEC(x,y). In some implementations, key hypotheses generation network 630 may be trained (e.g., on developer's side) on a corpus of keys that includes keys that are common to many documents, e.g., key classes "seller" (e.g., key class $K_1$), "buyer" (e.g., key class $K_2$), "seller's address" (e.g., key class $K_3$), "buyer's address" (e.g., key class $K_4$), "type of merchandize" (e.g., key class $K_5$), "payment type" (e.g., key class $K_6$), "date of the order" (e.g., key class $K_7$), "place of delivery" (e.g., key class $K_8$), and so on, in one example non-limiting implementation. In some implementations, input into key hypotheses generation network 630 may further include custom key embeddings 610 that represent keys commonly encountered in documents of a particular type (e.g., documents specific to client's applications), e.g., "tax exemption certificate" (e.g., key class $K_{100}$), "sales tax" (e.g., key class $K_{101}$), "prepaid taxes" (e.g., key class $K_{102}$), and so on, in one example non-limiting implementation. In some implementations, key hypotheses generation network 630 may be additionally trained on the user's side using a custom corpus of keys 620, which may be specific to the type(s) of documents of interest to the user's domain. In some implementations, additional training may be performed using a copy of training engine 152 instantiated on the user's computing device 110 together with KVA engine 112 (e.g., as illustrated schematically in FIG. 1).

Key hypotheses generation network 630 may output one or more key probabilities 640. Key probabilities 640 may be indexed by an object (a symbol sequence or graphics element), e.g., by the coordinates (x, y) of the object. As depicted schematically in FIG. 6, the generated key probabilities 640 for a given Object(x, y) may include probabilities that the respective object belongs to one of the keys, e.g., belongs to class $K_8$ with probability 63%, to class $K_1$ with probability 20%, to class $K_9$ with probability 13%, to class $K_2$ with probability 4%, and so on. In some implementations, key probabilities 640 may add up to 100% (as in this example). In some implementations, key probabilities 640 may be generalized likelihoods that may add up to less than 100% or more than 100%.

Key probabilities 640 may also be indexed by key. For example, as depicted schematically in FIG. 6, the generated key probabilities 640 for a given key class ($K_1$ class is shown) may include probabilities that various objects Object($x_1, y_1$), Object($x_2, y_2$), etc., belong to the respective key. Since a key may include multiple objects (e.g., words, numerals, punctuation marks, table elements), the probabilities for various objects belonging to the same key need not add up to 100%. In some implementations, key probabilities 640 may be indexed by both objects and keys. In some implementations, key probabilities 640 may be indexed by either objects or keys.

Based on the computed key probabilities 640, multiple key hypotheses 650 may be constructed. Different hypotheses may include various possible associations of objects and keys. For example, one hypothesis may associate Object($x_1, y_1$) with key $K_1$; another hypothesis may associate both Object($x_1, y_1$) and Object($x_2, y_2$) with key $K_1$; yet another hypothesis may associate Object($x_1, y_1$), Object($x_2, y_2$), and Object($x_3, y_3$) with key $K_1$; yet another hypotheses may associate Object($x_1,y_1$) and Object($x_3,y_3$) with key $K_1$, and so on. Different hypotheses may associate a given object with different keys.

For example, during processing of the document illustrated in FIG. 2, key hypotheses 650 for the key "phone" may include one key hypothesis that includes the word "Phone"; another key hypothesis that includes both words "Phone" and "Dept"; yet another key hypothesis that includes the words "Phone" and "Dept" together with symbols "/" and/or ":"; and so on. Some key hypotheses 650 may include a portion of a dividing line. Some key hypotheses 650 may include a portion of the corresponding value ("(800) 777-5533"). Some key hypotheses 650 may include a portion of the address value 204-2. Some key hypotheses 650 may include other words, symbols, and graphics elements.

Figure 7:
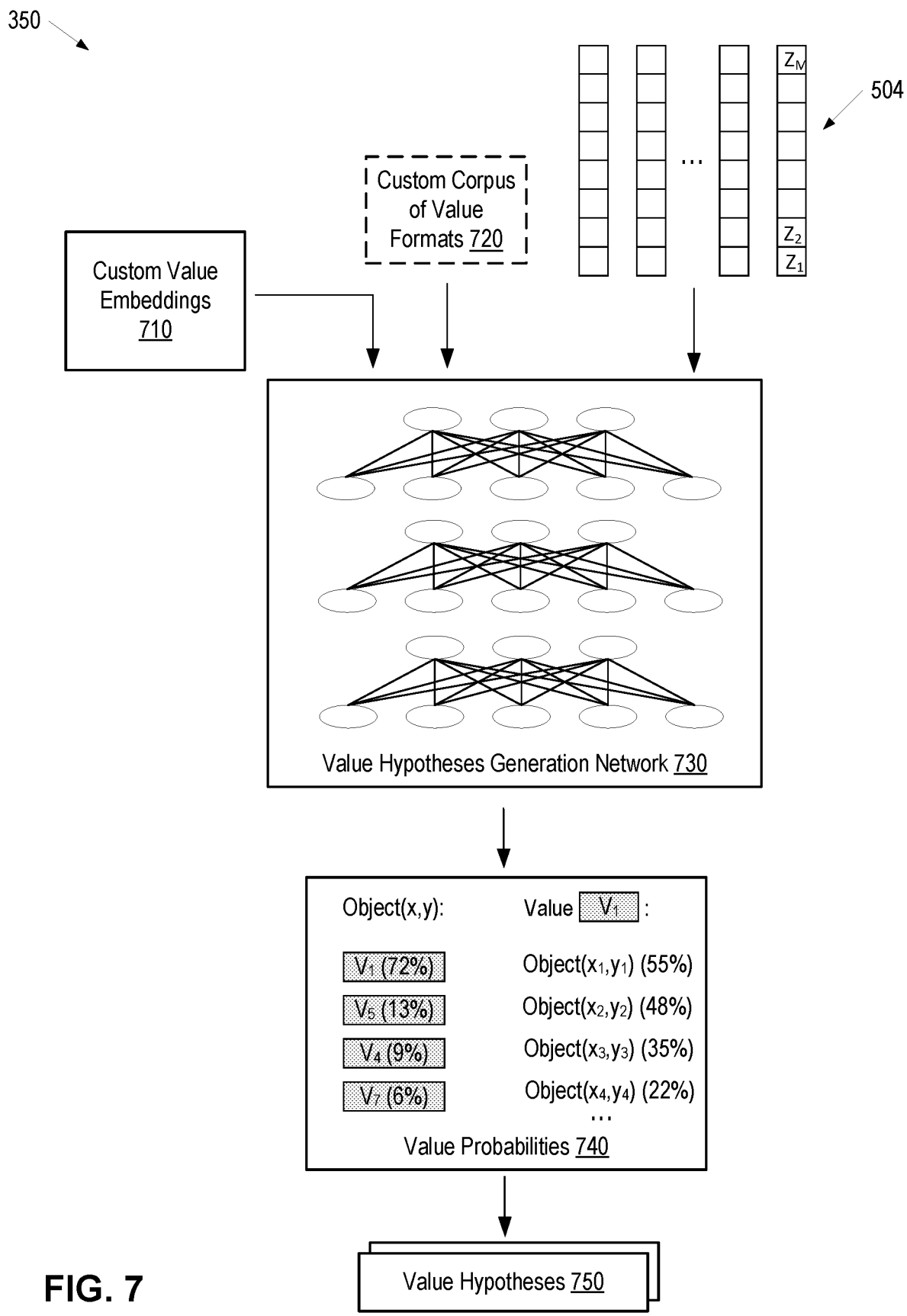
FIG. 7 is a schematic diagram illustrating example operations of a value hypotheses model, which may be deployed as part of a neural network system that identifies key-value associations in documents, in accordance with some implementations of the present disclosure.

FIG. 7 is a schematic diagram illustrating example operations of value hypotheses model 350, which may be deployed as part of a neural network system that identifies key-value associations in documents, in accordance with some implementations of the present disclosure. Value hypotheses model 350 may process the set of recalculated vectors {VEC(x,y)} 504 in parallel to processing of the same set by key hypotheses model 340 (as illustrated in FIG. 6). More specifically, the set of recalculated vectors {VEC(x, y)} 504 may be processed by a value hypotheses generation network 730 that predicts a class of values for various objects corresponding to the recalculated vectors VEC(x,y). In some implementations, value hypotheses generation network 730 may be trained (e.g., on developer's side) on typical values that are common to many documents, e.g., value classes "number" (e.g., value class $V_1$), "date" (e.g., value class $V_2$), "short word" (e.g., value class $V_3$), "word typed in all CAPS" (e.g., value class $V_4$), "special characters" such as dollar ($) sign, Euro (€) sign, percent (%) sign, etc. (e.g., value class $V_5$), "electronic signature" (e.g., value class $V_6$), "handwritten signature" (e.g., value class $V_7$), and so on, in one example non-limiting implementation. In some implementations, input into value hypotheses generation network 730 may include custom value embeddings 710 that may represent formats of values commonly encountered in documents of a particular type (e.g., documents specific to client's applications), such as a particular format of typical multi-word names of financial institutions (e.g., value class $V_{50}$), EAR barcode format (e.g., value class $V_{51}$), QR barcode format (e.g., value class $V_{52}$), and so on, in one example non-limiting implementation. In some implementations, value hypotheses generation network 730 may be additionally trained on the user's side using additional formats of values (not shown in FIG. 7) specific to the type(s) of documents of interest to the user's domain.

Value hypotheses generation network 730 may output one or more value probabilities 740. Value probabilities 740 may be indexed by an object (a symbol sequence or graphic element), e.g., by coordinates (x, y) of the object. As depicted schematically in FIG. 7, the generated value probabilities 740 for a given Object(x, y) may include probabilities that the respective object belongs to one of the values, e.g., belongs to class $V_1$ with probability 72%, to class $V_5$ with probability 13%, to class $V_4$ with probability 9%, to class $V_7$ with probability 6%, and so on. In some implementations, value probabilities 740 may add up to 100% value probabilities 740 may be generalized likelihoods that may add up to less than 100% or more than 100%.

Value probabilities 740 may also be indexed by value. For example, as depicted schematically in FIG. 7, the generated value probabilities 740 for a given value class ($V_1$ class is shown) may include probabilities that various objects Object($x_1,y_1$), Object($x_2,y_2$), etc., belong to the respective value. Since a value may include multiple objects (e.g. typed and/or handwritten words, numbers, signatures, and so on) or no objects, the probabilities for various objects belonging to the same value need not add up to 100%. In some implementations, value probabilities 740 may be indexed by both objects and values. In some implementations, value probabilities 740 may be indexed by either objects or values.

Based on the computed value probabilities 740, multiple value hypotheses 750 may be constructed. Different hypotheses may include various possible associations of objects and values. For example, one hypothesis may associate Object($x_1,y_1$) with value $V_1$; another hypotheses may associate Object($x_2,y_2$) and Object($x_3,y_3$) with value $V_1$; yet another hypotheses may associate Object($x_1,y_1$), Object($x_2, y_2$), and Object($x_4,y_4$) with value $V_1$; and so on. Similarly, different hypotheses may associate a given object with different values.

For example, during processing of the document illustrated in FIG. 2, value hypotheses 750 for value "(800) 777-5533" may include one value hypothesis that includes the sequence "(800)"; another value hypothesis that includes the sequence "777-5533"; yet another value hypothesis that includes the sequence "d Control number"; and so on. Some value hypotheses 750 may include a portion of a dividing line. Some value hypotheses 750 may include a portion of the corresponding key "Phone/Dept:"; some value hypotheses 750 may include a portion of the address value 204-2; some value hypotheses 750 may include other words, symbols, and graphics elements; some value hypotheses 750 may include null values.

With a continued reference to FIG. 3, the generated key hypotheses 650 and value hypotheses 750 may be processed by KVA model 360 that generates multiple KVA hypotheses 365. KVA model 360 may include one or more layers of neurons. Although KVA model 360 is depicted (for convenience of reference) as separate from key hypotheses model 340 and value hypotheses model 350, the models 340-360 may be implemented as different parts of a common neural network that processes vectors {VEC(x,y)}, which may also receive, via additional input channels, custom key embeddings 610, custom value embeddings 710, custom corpus of keys 620, and/or custom corpus of value formats 720. The common network may include subnetworks that generate key hypotheses 650 and value hypotheses 750, as described above in conjunction with FIG. 6 and FIG. 7. During training, the subnetworks may have additional output channels to provide training engine 152 with access to intermediate outputs (e.g., key hypotheses 650 and value hypotheses 750). This access allow training engine 152 to apply a loss function to the intermediate outputs and use key and value ground truth to train the subnetworks (key hypotheses model 340 and value hypotheses model 350). In some implementations, these subnetworks may be trained before training the subnetwork (e.g., KVA model 360) that generates KVA hypotheses 365.

KVA model 360 may generate multiple KVA hypotheses 365 by forming key-value pairs, e.g., by selecting a key from the set of key hypotheses 650 and a value from the set of value hypotheses 750. Each KVA hypothesis so formed may be characterized by a KVA probability that is based (at least partially) on the probabilities of the respective key hypothesis and value hypothesis. For example, KVA model 360 may form a KVA hypothesis that associates Object($x_1$, $y_1$), or any collection of such objects, hypothesized (according to one of key hypotheses 650) to correspond with probability $P_K$=86% to key class $K_1$ with Object($x_2$, $y_2$), or a collection of objects, hypothesized (according to one of value hypotheses 750) to correspond to value class $V_1$ with probability $P_V$=57%. KVA model 360 may then assign a KVA probability $P_{KVA}$=$P_K \cdot P_V$=49% to this hypothesized key-value association of Object($x_1$, $y_1$) with object Object($x_2$, $y_2$), in one non-limiting example implementation.

In some implementations, the assigned KVA probability may be additionally weighted with a geometric weight W that accounts for the mutual positioning of Object($x_1$, $y_1$) and Object($x_2$, $y_2$), e.g., $P_{KVA}$=$W \cdot P_K \cdot P_V$. More Specifically, Weights W May be higher for objects that are closer together than for objects that are farther apart, higher for objects that are located vertically or horizontally relative to each other than for objects located diagonally from each other, and so on. Weights W applied by KVA model 360 may be learned during training based on processing of a large number of correct and incorrect KVA hypotheses 365.

KVA model 360 may represent each formed KVA hypothesis as a two-node graph in which one or more objects {Object($x_K$, $y_K$)} hypothesized as the key (a first node) is associated with one or more objects {Object($x_V$, $y_V$)} hypothesized as the value (a second node). The first node and the second node may be connected by an edge associated with corresponding probability $P_{KVA}$, which may be determined according to the example scheme described above or using some other suitable scheme that accounts for one or more of: (1) the likelihood that the one or more objects {Object($x_K$, $y_K$)} belong to a certain key class, (2) the likelihood that the one or more objects {Object($x_V$, $y_V$)} belong to a corresponding value class, and (3) a relative geometric arrangement of the two objects (or sets of objects).

Using the generated KVA hypotheses 365, an evaluator model 370 may form one or more aggregated hypotheses in which multiple KVA hypotheses 365 generated for various key-value associations of input document 302 are combined. In some implementations, the aggregated hypotheses may be constructed using a number of metrics. In some implementations, one metric may include consistency (e.g., absence of ambiguities), where different KVA hypotheses, in which the same object is hypothesized to be included in multiple keys, multiple values, or both a key and a value, are not to be combined in the same aggregate hypothesis. As a result, if a given object is assigned to a key or value node of a particular two-node graph, other two-node graphs in which the same object is used as part of a key node or value node may be prohibited from being included in the same aggregated hypothesis (but may be included in other aggregated hypotheses).

Another metric may be completeness, where aggregated hypotheses that identify and include a larger number of KVAs are favored over those aggregated hypotheses that include a smaller number of KVAs (and thus leave at least some likely objects unassigned). In some implementations, the completeness metric may enhance the probability (or some other score) of an aggregated hypothesis by an amount that increases with (e.g., proportionally to) the number of KVA hypotheses. In some implementations, the completeness metric may amount to adding KVA probabilities of the KVAs included in a particular aggregated hypothesis, $P_{agg}$=$\Sigma P_{KVA}$=$\Sigma W \cdot P_K \cdot P_V$, where the sum extends over all KVA of the aggregated hypothesis. As a result, the probabilities $P_{agg}$ may implicitly favor those aggregated hypotheses that have a larger number of KVAs and, therefore, include more terms in the respective sums.

For example, a certain region of input document 302 may include two hypothesized keys Object($x_K$, $y_K$) and Object($x'_K$, $y'_K$) and two hypothesized values Object($x_V$, $y_V$) and Object($x'_V$, $y'_V$). Correspondingly, four KVA hypotheses may be formed: Object($x_K$, $y_K$)→Object($x_V$, $y_V$); Object($x_K$, $y_K$)→Object($x'_V$, $y'_V$); Object($x'_K$, $y'_K$)→Object($x_V$, $y_V$); and Object($x'_K$, $y'_K$)→Object($x'_V$, $y'_V$). The consistency metric and the completeness metric may favor generation of two aggregated hypotheses; the first hypothesis aggregated including Object($x_K$, $y_K$)→Object($x_V$, $y_V$) and Object($x'_K$, $y'_K$)→Object($x'_V$, $y'_V$) KVAs, and the second aggregated hypothesis including Object($x_K$, $y_K$)→Object($x'_V$, $y'_V$) and Object($x'_K$, $y'_K$)→Object($x_V$, $y_V$).

In some implementations, another metric may be feasibility, where KVA hypotheses 365 that have probability $P_{KVA}$ below a certain (e.g., empirically determined threshold) $P_T$ may be excluded so that only KVA hypotheses 365 with $P_{KVA}$>$P_T$ are used in forming aggregated hypotheses. This may eliminate a number of low-likelihood aggregated hypotheses whose evaluation requires valuable computational resources and slows down operation of KVA identification.

Figure 8A:
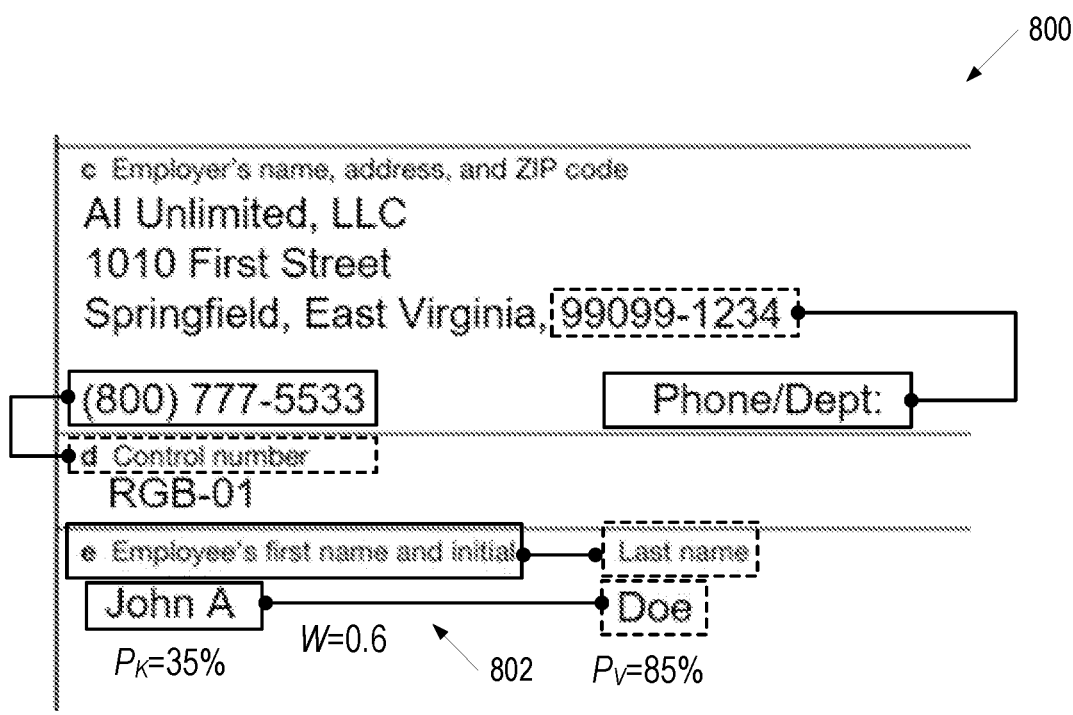
FIGS. 8A-B illustrate example aggregated hypotheses for a portion of the document of FIG. 2, in accordance with some implementations of the present disclosure.
Figure 8B:
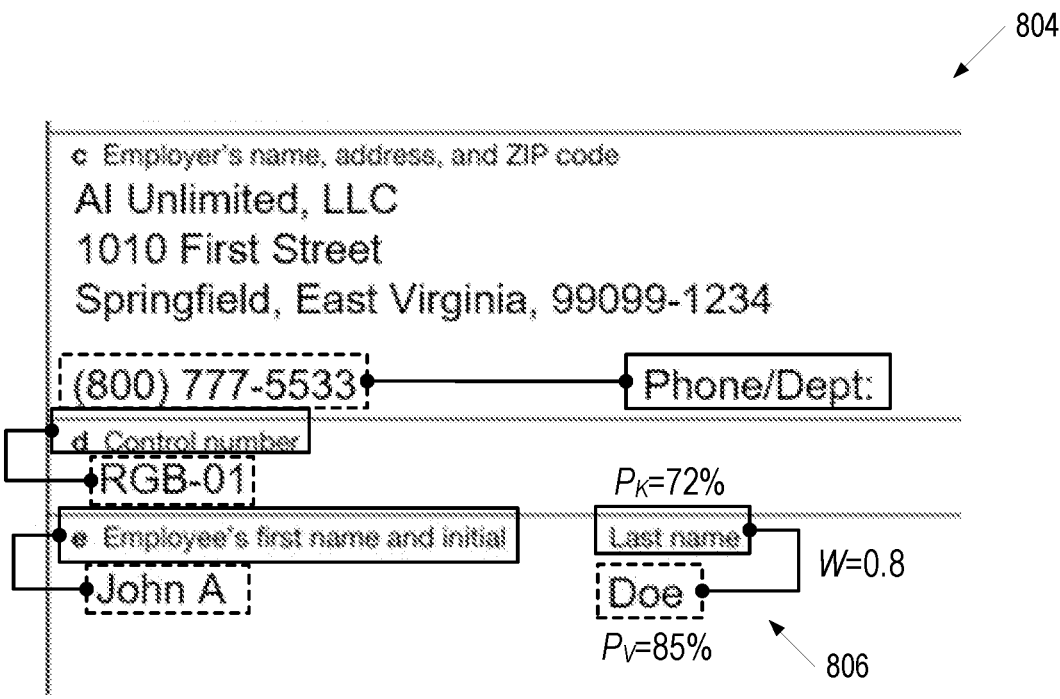

FIGS. 8A-B illustrate example aggregated hypotheses for a portion of the document of FIG. 2, in accordance with some implementations of the present disclosure. In FIGS. 8A-B, solid boxes indicate key hypotheses 650 and dashed boxes indicate value hypotheses 750. Various KVA hypotheses 365 are indicated with linked boxes. FIG. 8A illustrates an aggregated hypothesis 800 that includes incorrect KVAs. As an example illustration, incorrect KVA hypothesis 802 includes the symbol sequence "John A" identified as a key with probability $P_K$=35% and the symbol sequence "Doe" identified as a value with probability $P_V$=85%. The geometric arrangement (distance and relative positioning) of the key and the value is characterized by geometric weight W=0.6. FIG. 8B illustrates an aggregated hypothesis 804 that includes correct KVAs. As another example illustration, KVA hypothesis 806 includes the symbol sequence "Last name" identified as a key with probability $P_K$=72% and the symbol sequence "Doe" identified as a value with probability $P_V$=85%. The geometric arrangement (distance and relative positioning) of the key and the value is characterized by geometric weight W=0.8.

In some implementations, evaluator model 370 may select the most likely aggregated hypothesis by identifying the aggregated hypothesis with the highest probability $P_{agg}$. Various KVA hypotheses 365 of the most likely aggregated hypothesis may then become final key-value outputs 380, which may be stored in conjunction with document 302, are entered in a relevant database, presented to a user, and/or the like. In some implementations, evaluator model 370 may implement one or more algorithms of solving the maximum bipartite matching problem for a graph that includes two-node associations of various hypothesized keys and values, as may be output by KVA model 360 that processes outputs of key hypotheses model 340 and value hypotheses model 350 using various evaluation metrics (e.g., consistency, completeness, minimum feasibility, and the like). Various algorithms of solving the maximum bipartite matching problem used by evaluator model 370 may include the Hungarian algorithm, the Stable marriage algorithm, the Blossom algorithm, the Hopcroft-Karp algorithm, and/or any other suitable algorithm.

In some implementations, evaluator model 370 may be a fully algorithmic computational model in which the maximum matching problem is solved using one or more iterative techniques (e.g., as referenced above) and based on probabilities $P_K$ and $P_V$ generated by the trained neural network models 340-360, with geometric weights W for different distances and relative key/value positions determined empirically during training of the system 300. In some implementations, evaluator model 370 may be a trained neural network model. In some implementations, evaluator model 370 may be trained separately from models 340-360.

During training of system 300 and its various components and models, an incorrect aggregated hypothesis (a hypothesis with one or more incorrectly determined KVAs) may be erroneously favored over a correct hypothesis, e.g., aggregated hypothesis 800 of FIG. 8A may be favored over correct aggregated hypothesis 804 of FIG. 8B. In such instances, a developer may mark (annotate) objects incorrectly determined as keys and/or values and may further mark (annotate) any incorrect KVAs of objects correctly identified as keys and/or values. The annotated objects may then be used as ground truth in subsequent training of system 300.

Figure 9:
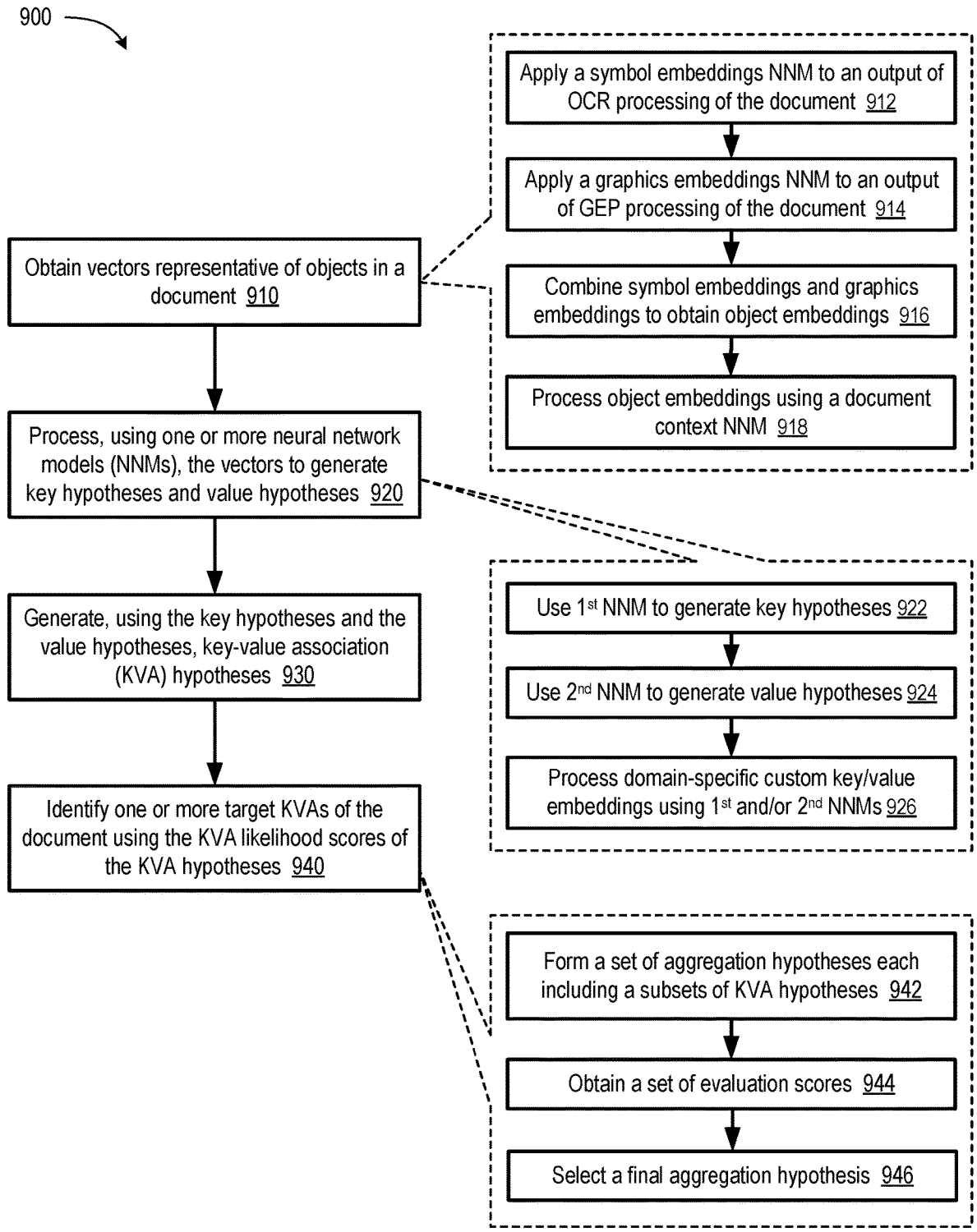
FIG. 9 is a flow diagram illustrating example method of efficient identification of key-value associations in documents using neural networks, in accordance with some implementations of the present disclosure

FIG. 9 is a flow diagram illustrating example method 900 of efficient identification of key-value associations in documents using neural networks, in accordance with some implementations of the present disclosure. Method 900 may be performed by processing logic that may include hardware (such as circuitry, dedicated logic, programmable logic, microcode, etc.), software (such as instructions run on a processing device), firmware, or a combination thereof. In one implementation, method 900 may be performed by a processing device (e.g. a processing device 1002 of FIG. 10) of a computing device 110 and/or a training server 150, as described in connection with FIG. 1. In certain implementations, method 900 may be performed by a single processing thread. Alternatively, method 900 may be performed by two or more processing threads, each thread executing one or more individual functions, routines, subroutines, or operations of the method. In an illustrative example, the processing threads implementing method 900 may be synchronized (e.g., using semaphores, critical sections, and/or other thread synchronization mechanisms). Alternatively, the processing threads implementing method 900 may be executed asynchronously with respect to each other. Therefore, while FIG. 9 and the associated description show the operations of method 900 in a certain order, various implementations of method 900 may perform at least some of the described operations in parallel and/or in arbitrary selected orders. Some operations of method 900 may not always be performed.

At block 910, the processing device (e.g., a computer) implementing method 900 may obtain a plurality of vectors (e.g., a set of recalculated vectors $\{VEC(x,y)\}$ 504 in FIG. 3). Each vector of the plurality of vectors may be representative of one of a plurality of objects in a document (e.g., input document 302 in FIG. 3). Objects may include any symbol or a combination (sequence) of symbols or any graphics elements or portions thereof. Symbols may include letters, numerals, punctuation marks, glyphs, or any combination thereof, and may be in any language, alphabet, font, or representation (e.g., numerals may be Arabic numerals, Roman numerals, decimal numerals, binary numerals, and so on).

In some implementations, obtaining the plurality of vectors may include performing one or more operations illustrated by the top callout portion of FIG. 9. More specifically, at block 912, method 900 may include applying a symbol embeddings neural network model (NNM) (e.g., symbol embeddings network 320-1 in FIG. 4) to an output of an optical character recognition processing (e.g., OCR 410-1) of the document to obtain a plurality of symbol embeddings. At block 914, method 900 may include applying a graphics embeddings NNM (e.g., graphics embeddings network 320-2 in FIG. 4) to an output of a graphics element recognition processing (e.g., GER 410-2) of the document to obtain a plurality of graphics embeddings. At block 916, method 900 may include combining the plurality of symbol embeddings and the plurality of graphics embeddings to obtain a plurality of object embeddings (e.g., a set of object embeddings $\{vec(x,y)\}$ 322). Each object embedding may be representative of a visual appearance of a respective object in the document. At block 918, method 900 may include processing the plurality of object embeddings (e.g., $\{vec(x,y)\}$) using a document context NNM (e.g., document context model 330 in FIG. 3) to obtain the plurality of vectors (e.g., $\{VEC(x,y)\}$). Individual vectors (e.g., vectors $\{VEC(x_1,y_1)\}$) may be obtained using at least a sub-plurality of the plurality of object embeddings (e.g., at least a sub-plurality of embeddings $\{vec(x,y)\}$ with coordinates (x, y) that are in the vicinity of the coordinates $(x_1,y_1)$). In some implementations, each vector may be obtained using all embeddings of the document (e.g., by processing the embedding using one or more convolutional layers and/or fully-connected layers of neurons).

At block 920, method 900 may include processing, using one or more neural NNMs, the plurality of vectors to generate a plurality of key hypotheses (e.g., key hypotheses 650). Each key hypothesis may associate a key with one or more objects of the plurality of objects. Additionally, processing the plurality of vectors may generate a plurality of value hypotheses (e.g., value hypotheses 750). Each value hypothesis may associate a key with zero or more objects of the plurality of objects.

In some implementations, generating key and value hypotheses may include performing one or more operations illustrated by the middle callout portion of FIG. 9. More specifically, at block 922, method 900 may include using a first NNM (e.g., key hypothesis model 340) to process the plurality of vectors to generate the plurality of key hypotheses. Similarly, at block 924, method 900 may include using a second NNM (e.g., value hypothesis model 350) to process the plurality of vectors to generate the plurality of value hypotheses. In some implementations, the first NNM and the second NNM may be processing the plurality of vectors in parallel.

In some implementations, as indicated with block 926, method 900 may involve the first NNM additionally processing a set of one or more custom key embeddings (e.g., custom key embeddings 610 in FIG. 6) associated with a domain-specific corpus of keys. In some implementations, the set of one or more custom key embeddings may be generated using one or more training documents each comprising at least one key of the domain-specific corpus of keys (e.g., custom corpus of keys 620 in FIG. 6). Similarly, method 900 may involve the second NNM additionally processing a set of one or more custom value embeddings (e.g., custom value embeddings 710 in FIG. 7) associated with a domain-specific value format. In some implementations, the set of one or more custom value embeddings is generated using one or more training documents each comprising at least one value of the domain-specific value format (e.g., custom corpus of value formats 720 in FIG. 7).

At block 930, method 900 may continue with generating, using the plurality of key hypotheses and the plurality of value hypotheses, one or more key-value association (KVA) hypotheses (e.g., KVA hypotheses 365 in FIG. 3). Each KVA hypothesis may associate a selected key hypothesis of the plurality of key hypotheses with a selected value hypothesis of the plurality of value hypotheses. Each KVA hypothesis may be characterized by a KVA likelihood score (e.g., probability, generalized likelihood, etc.) that may based on a key likelihood score associated with the selected key hypothesis (e.g., a probability that the respective one or more objects are associated with the respective key). The KVA likelihood score may be further based on a value likelihood score associated with the selected value hypothesis (e.g., a probability that the respective zero or more objects are associated with the respective value). In some implementations, the KVA likelihood score may be further based on a relative geometric arrangement of a hypothesized key of the selected key hypothesis and a hypothesized value of the selected value hypothesis. For example, the KVA likelihood score may depend on whether the hypothesized key and hypothesized value are positioned horizontally from each other, vertically from each other, diagonally from each other, close to each other, far from each other, and so on.

At block 940, method 900 may continue with identifying one or more target KVAs of the document using the KVA likelihood scores of the generated KVA hypotheses. In some implementations, identifying the target KVAs may include performing one or more operations illustrated by the bottom callout portion of FIG. 9. More specifically, at block 942, method 900 may include forming a set of aggregation hypotheses. Each aggregation hypothesis may include a subset of KVA hypotheses (e.g., as illustrated in FIG. 8A and FIG. 8B). At block 944, method 900 may continue with using an evaluation metric to obtain a set of evaluation scores for various aggregated hypotheses (e.g., $P_{agg}$). Each evaluation score may characterize a likelihood (probability) of a respective aggregation hypothesis and may be determined using the KVA likelihood scores of the respective subset of KVA hypotheses. In some implementations, the evaluation metric may favor (e.g., assign additional score to) an aggregated hypothesis that includes a larger subset of KVA hypotheses over an aggregated hypothesis that includes a smaller subset of KVA hypotheses. At block 946, method 900 may include selecting a final aggregation hypothesis based on the obtained set of evaluation scores. For example, the final aggregation hypothesis may be the aggregation hypothesis having the highest evaluation score.

Figure 10:
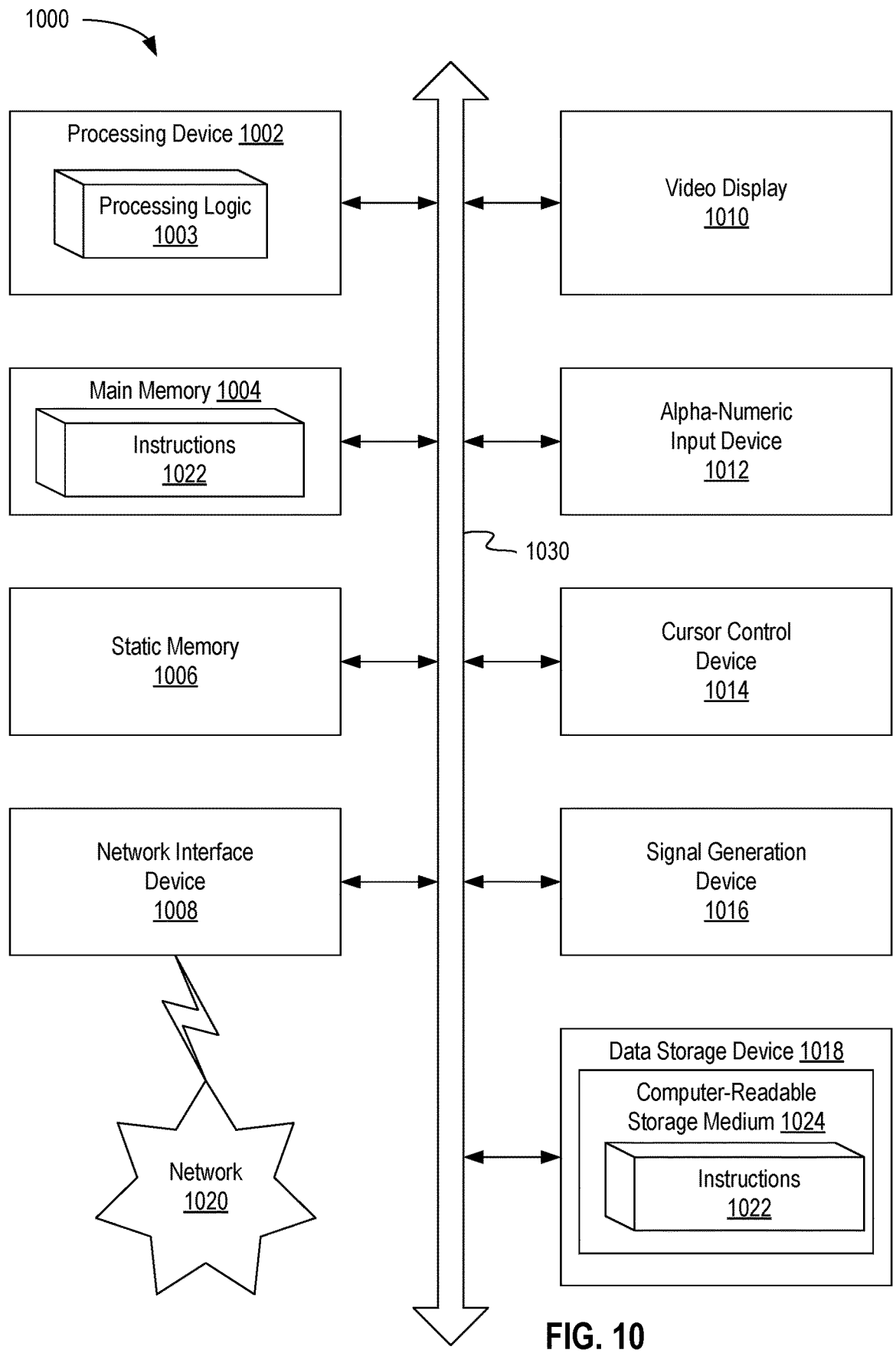
FIG. 10 illustrates a block diagram of a computer system in accordance with some implementations of the present disclosure.

FIG. 10 depicts an example computer system 1000 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 1000 includes a processing device 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 may include processing logic 1003 configured to execute instructions 1022 for implementing KVA engine 112 and/or training engine 152 of FIG. 1 and to perform operations of method 900 of FIG. 9.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker). In one illustrative example, the video display unit 1010, the alphanumeric input device 1012, and the cursor control device 1014 may be combined into a single component or device (e.g., an LCD touch screen).

The data storage device 1018 may include a computer-readable medium 1024 on which is stored the instructions 1022 embodying any one or more of the methodologies or functions described herein. The instructions 1022 may also reside, completely or at least partially, within the main memory 1004 and/or within the processing device 1002 during execution thereof by the computer system 1000, the main memory 1004 and the processing device 1002 also constituting computer-readable media. In some implementations, the instructions 1022 may further be transmitted or received over a network 1020 is the network interface device 1008.

While the computer-readable storage medium 1024 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
    obtaining a plurality of vectors, wherein each vector of the plurality of vectors is representative of one of a plurality of objects in a document;
    processing, using one or more neural network models (NNMs), the plurality of vectors to generate:
        a plurality of key hypotheses, wherein each key hypothesis of the plurality of key hypotheses associates a key with one or more objects of the plurality of objects, and
        a plurality of value hypotheses, wherein each value hypothesis of the plurality of value hypotheses associates a value with zero or more objects of the plurality of objects;
    generating, using the plurality of key hypotheses and the plurality of value hypotheses, one or more key-value association (KVA) hypotheses, wherein each KVA hypothesis associates a selected key hypothesis of the plurality of key hypotheses with a selected value hypothesis of the plurality of value hypotheses, and wherein each KVA hypothesis is characterized by a KVA likelihood score that is based on at least:
a key likelihood score associated with the selected key hypothesis, and
a value likelihood score associated with the selected value hypothesis; and
identifying one or more target KVAs of the document using the KVA likelihood scores of the generated KVA hypotheses.

2. The method of claim 1, wherein identifying the one or more target KVAs of the document comprises:
forming a set of aggregation hypotheses, each aggregation hypothesis comprising a respective subset of KVA hypotheses of the plurality of generated KVA hypotheses;
using an evaluation metric to obtain a set of evaluation scores, wherein each evaluation score characterizing a likelihood of a respective aggregation hypothesis and is determined using the KVA likelihood scores of the respective subset of KVA hypotheses; and
selecting a final aggregation hypothesis based on the obtained set of evaluation scores.

3. The method of claim 2, wherein the evaluation metric favors an aggregated hypothesis comprising a larger subset of KVA hypotheses over an aggregated hypothesis comprising a smaller subset of KVA hypotheses.

4. The method of claim 1, wherein the plurality of vectors is obtained by processing a plurality of object embeddings using a document context NNM, wherein each object embedding of the plurality of object embeddings is representative of a visual appearance of a respective object of the plurality of objects in the document, and wherein individual vectors of the plurality of vectors are obtained using at least a sub-plurality of the plurality of object embeddings.

5. The method of claim 4, wherein the plurality of object embeddings are obtained by combining a plurality of symbol embeddings and a plurality of graphics embeddings, wherein each of the plurality of symbol embeddings is obtained by applying a symbol embeddings NNM to an output of an optical character recognition processing of the document, and wherein each of the plurality of graphics embeddings is obtained by applying a graphics embeddings NNM to an output of a graphics element recognition processing of the document.

6. The method of claim 1, wherein the KVA likelihood score is further based on a relative geometric arrangement of a hypothesized key of the selected key hypothesis and a hypothesized value of the selected value hypothesis.

7. The method of claim 1, wherein the one or more NNMs are trained using at least one training document annotated with ground truth KVAs.

8. The method of claim 1, wherein the plurality of key hypotheses are generated using a first NNM of the one or more NNMs and the plurality of value hypotheses are generated using a second NNM of the one or more NNMs, wherein the first NNM and the second NNM are processing the plurality of vectors in parallel.

9. The method of claim 8, wherein the first NNM additionally processes a set of one or more custom key embeddings associated with a domain-specific corpus of keys.

10. The method of claim 9, wherein the set of one or more custom key embeddings is generated using one or more training documents each comprising at least one key of the domain-specific corpus of keys.

11. The method of claim 8, wherein the second NNM additionally processes a set of one or more custom value embeddings associated with a domain-specific value format.

12. The method of claim 11, wherein the set of one or more custom value embeddings is generated using one or more training documents each comprising at least one value of the domain-specific value format.

13. A system comprising:
a memory; and
a processing device operatively coupled to the memory, the processing device to:
obtain a plurality of vectors, wherein each vector of the plurality of vectors is representative of one of a plurality of objects in a document;
process, using one or more neural network models (NNMs), the plurality of vectors to generate:
a plurality of key hypotheses, wherein each key hypothesis of the plurality of key hypotheses associates a key with one or more objects of the plurality of objects, and
a plurality of value hypotheses, wherein each value hypothesis of the plurality of value hypotheses associates a value with zero or more objects of the plurality of objects;
generate, using the plurality of key hypotheses and the plurality of value hypotheses, one or more key-value association (KVA) hypotheses, wherein each KVA hypothesis associates a selected key hypothesis of the plurality of key hypotheses with a selected value hypothesis of the plurality of value hypotheses, and wherein each KVA hypothesis is characterized by a KVA likelihood score that is based on at least:
a key likelihood score associated with the selected key hypothesis, and
a value likelihood score associated with the selected value hypothesis; and
identify one or more target KVAs of the document using the KVA likelihood scores of the generated KVA hypotheses.

14. The system of claim 13, wherein to identify the one or more target KVAs of the document, the processing device is to:
form a set of aggregation hypotheses, each aggregation hypothesis comprising a respective subset of KVA hypotheses of the plurality of generated KVA hypotheses;
use an evaluation metric to obtain a set of evaluation scores, wherein each evaluation score characterizing a likelihood of a respective aggregation hypothesis and is determined using the KVA likelihood scores of the respective subset of KVA hypotheses; and
select a final aggregation hypothesis based on the obtained set of evaluation scores.

15. The system of claim 13, wherein the plurality of vectors is obtained by processing a plurality of object embeddings using a document context NNM, wherein each object embedding of the plurality of object embeddings is representative of a visual appearance of a respective object of the plurality of objects in the document, and wherein individual vectors of the plurality of vectors are obtained using at least a sub-plurality of the plurality of object embeddings.

16. The system of claim 15, wherein the plurality of object embeddings are obtained by combining a plurality of symbol embeddings and a plurality of graphics embeddings, wherein each of the plurality of symbol embeddings is obtained by applying a symbol embeddings NNM to an output of an optical character recognition processing of the document, and wherein each of the plurality of graphics embeddings is obtained by applying a graphics embeddings NNM to an output of a graphics element recognition processing of the document.

17. The system of claim 13, wherein the KVA likelihood score is further based on a relative geometric arrangement of a hypothesized key of the selected key hypothesis and a hypothesized value of the selected value hypothesis.

18. The system of claim 13, wherein the plurality of key hypotheses are generated using a first NNM of the one or more NNMs and the plurality of value hypotheses are generated using a second NNM of the one or more NNMs,
wherein the first NNM and the second NNM are processing the plurality of vectors in parallel,
wherein the first NNM additionally processes a set of one or more custom key embeddings associated with a domain-specific corpus of keys, and
wherein the set of one or more custom key embeddings is generated using one or more training documents each comprising at least one key of the domain-specific corpus of keys.

19. The system of claim 18, wherein the second NNM additionally processes a set of one or more custom value embeddings associated with a domain-specific value format, and
wherein the set of one or more custom value embeddings is generated using one or more training documents each comprising at least one value of the domain-specific value format.

20. A non-transitory machine-readable storage medium including instructions that, when accessed by a processing device, cause the processing device to:

obtain a plurality of vectors, wherein each vector of the plurality of vectors is representative of one of a plurality of objects in a document;

process, using one or more neural network models (NNMs), the plurality of vectors to generate:

a plurality of key hypotheses, wherein each key hypothesis of the plurality of key hypotheses associates a key with one or more objects of the plurality of objects, and a plurality of value hypotheses, wherein each value hypothesis of the plurality of value hypotheses associates a value with zero or more objects of the plurality of objects;

generate, using the plurality of key hypotheses and the plurality of value hypotheses, one or more key-value association (KVA) hypotheses, wherein each KVA hypothesis associates a selected key hypothesis of the plurality of key hypotheses with a selected value hypothesis of the plurality of value hypotheses, and wherein each KVA hypothesis is characterized by a KVA likelihood score that is based on at least:

a key likelihood score associated with the selected key hypothesis, and a value likelihood score associated with the selected value hypothesis; and identify one or more target KVAs of the document using the KVA likelihood scores of the generated KVA hypotheses.

* * * * *